(12) United States Patent
Woodrow et al.

(10) Patent No.: US 10,078,668 B1
(45) Date of Patent: Sep. 18, 2018

(54) SYSTEMS AND METHODS FOR UTILIZING INFORMATION-ASSET METADATA AGGREGATED FROM MULTIPLE DISPARATE DATA-MANAGEMENT SYSTEMS

(71) Applicant: Veritas Technologies LLC, Mountain View, CA (US)

(72) Inventors: Karl Woodrow, Thatcham (GB); Stuart Carter, Rüdlingen (CH)

(73) Assignee: Veritas Technologies LLC, Mountain View, CA (US)

( * ) Notice: Subject to any disclaimer, the term of this patent is extended or adjusted under 35 U.S.C. 154(b) by 623 days.

(21) Appl. No.: 14/483,136

(22) Filed: Sep. 10, 2014

Related U.S. Application Data

(60) Provisional application No. 61/988,213, filed on May 4, 2014.

(51) Int. Cl.
G06F 7/00 (2006.01)
G06F 17/30 (2006.01)
G06F 15/16 (2006.01)

(52) U.S. Cl.
CPC ........ *G06F 17/30501* (2013.01); *G06F 15/16* (2013.01); *G06F 17/30525* (2013.01)

(58) Field of Classification Search
CPC ........................... G06F 15/16; G06F 17/30525
USPC ................................................. 707/667, 736
See application file for complete search history.

(56) References Cited

U.S. PATENT DOCUMENTS

| 6,446,061 | B1 | 9/2002 | Doerre et al. |
| 6,658,413 | B1 | 12/2003 | Reddy et al. |
| 8,364,720 | B2 * | 1/2013 | Levy .................. G06F 17/3002 382/100 |
| 8,417,715 | B1 * | 4/2013 | Bruckhaus ........ G06F 17/30994 705/26.1 |

(Continued)

FOREIGN PATENT DOCUMENTS

WO    WO 2015/055502 A2    4/2015

OTHER PUBLICATIONS

CommVault Simpana Software; http://www.commvault.com/simpana-software, as accessed May 1, 2014.

(Continued)

*Primary Examiner* — Mark D Featherstone
*Assistant Examiner* — Eliyah S Harper
(74) *Attorney, Agent, or Firm* — FisherBroyles LLP

(57) ABSTRACT

The disclosed computer-implemented method for utilizing information-asset metadata aggregated from multiple disparate data-management systems may include (1) receiving a request for information about one or more information assets of an entity whose metadata satisfies a metadata-search criterion, (2) identifying a global metadata repository that stores metadata of the information assets, (3) querying the global metadata repository for information about one or more of the information assets whose metadata satisfies the metadata-search criterion, (4) receiving, from the global metadata repository, information about at least one information asset whose metadata satisfies the metadata-search criterion, and (5) responding to the request using the information about the information asset. Various other methods, systems, and computer-readable media are also disclosed.

20 Claims, 15 Drawing Sheets

(56) References Cited

U.S. PATENT DOCUMENTS

| | | | |
|---|---|---|---|
| 8,458,186 | B2 | 6/2013 | Stringham et al. |
| 8,494,894 | B2* | 7/2013 | Jaster ............... G06F 17/30734 705/7.29 |
| 8,533,176 | B2* | 9/2013 | Pandey ................. H04L 63/08 707/696 |
| 8,589,447 | B1* | 11/2013 | Grunwald ......... G06F 17/30088 707/638 |
| 8,682,886 | B2 | 3/2014 | Sorkin et al. |
| 8,737,683 | B2 | 5/2014 | Kirmse et al. |
| 8,755,837 | B2* | 6/2014 | Rhoads ............ G06F 17/30244 455/556.1 |
| 9,268,849 | B2* | 2/2016 | Siedlecki .......... G06F 17/30864 |
| 9,311,326 | B2* | 4/2016 | Goyen .............. G06F 17/30174 |
| 2001/0037324 | A1 | 11/2001 | Agrawal et al. |
| 2001/0039544 | A1 | 11/2001 | Chakrabarti et al. |
| 2002/0010708 | A1 | 1/2002 | McIntosh |
| 2002/0055942 | A1 | 5/2002 | Reynolds |
| 2003/0145277 | A1 | 7/2003 | Neal et al. |
| 2005/0038805 | A1* | 2/2005 | Maren ............... G06F 17/30029 |
| 2006/0265427 | A1* | 11/2006 | Cohen ............... G06F 17/30038 |
| 2007/0112783 | A1* | 5/2007 | McCreight ........ G06F 17/30864 |
| 2007/0244892 | A1 | 10/2007 | Narancic |
| 2008/0071908 | A1 | 3/2008 | Nair et al. |
| 2008/0077852 | A1* | 3/2008 | Fleishman ............. H04N 7/163 715/234 |
| 2008/0235077 | A1 | 9/2008 | Harkness et al. |
| 2008/0306947 | A1* | 12/2008 | Kolesnikov ....... G06F 17/30734 |
| 2009/0024561 | A1* | 1/2009 | Palanisamy ....... G06F 17/30174 |
| 2009/0043825 | A1* | 2/2009 | Bourne ................. G06F 17/301 |
| 2009/0049040 | A1* | 2/2009 | Fay .................. G06F 17/30734 |
| 2009/0063419 | A1* | 3/2009 | Nurminen ......... G06F 17/30206 |
| 2009/0125828 | A1 | 5/2009 | Fried et al. |
| 2010/0088317 | A1 | 4/2010 | Bone et al. |
| 2010/0146004 | A1 | 6/2010 | Sim-Tang et al. |
| 2010/0274750 | A1 | 10/2010 | Oltean et al. |
| 2011/0113466 | A1 | 5/2011 | Stringham et al. |
| 2011/0145217 | A1* | 6/2011 | Maunder ........... G06F 17/30094 707/709 |
| 2011/0225125 | A1* | 9/2011 | Colgrave .......... G06F 17/30887 707/689 |
| 2011/0320480 | A1* | 12/2011 | Kisin ................ G06F 17/30067 707/769 |
| 2012/0047483 | A1* | 2/2012 | Amit ................. G06F 17/30861 717/104 |
| 2012/0198073 | A1* | 8/2012 | Srikanth ............... G06F 9/5027 709/226 |
| 2013/0013650 | A1* | 1/2013 | Shum ................ G06F 17/30525 707/805 |
| 2013/0054731 | A1 | 2/2013 | Branton |
| 2013/0166543 | A1* | 6/2013 | MacDonald ........ G06F 17/3002 707/723 |
| 2013/0204886 | A1 | 8/2013 | Faith et al. |
| 2014/0006244 | A1 | 1/2014 | Crowley et al. |
| 2014/0052689 | A1 | 2/2014 | Ficara et al. |
| 2014/0068706 | A1 | 3/2014 | Aissi |
| 2014/0081890 | A1 | 3/2014 | Casiano |
| 2014/0089246 | A1* | 3/2014 | Adriaansen .............. G06N 5/02 706/46 |
| 2014/0098101 | A1 | 4/2014 | Friedlander et al. |
| 2014/0101124 | A1* | 4/2014 | Scriffignano ...... G06F 17/30864 707/706 |
| 2014/0244662 | A1* | 8/2014 | Mo .................... G06F 17/30017 707/748 |
| 2014/0294169 | A1 | 10/2014 | Barinov |
| 2015/0088812 | A1 | 3/2015 | Ziauddin et al. |
| 2015/0095430 | A1 | 4/2015 | Kaushik et al. |
| 2015/0286697 | A1* | 10/2015 | Byrne ............... G06F 17/30663 707/600 |
| 2015/0347773 | A1 | 12/2015 | Bonney et al. |
| 2016/0306897 | A1 | 10/2016 | Huang et al. |

OTHER PUBLICATIONS

Apache Spark, a Fast Big Data Analytics Engine; https://bighadoop.wordpress.com/2014/04/03/apache-spark-a-fast-big-data-analytics-engine/, as accessed May 1, 2014.

Dourish, Paul, et al., "Extending Document Management Systems with User-Specific Active Properties", ACM Transactions on Information Systems, vol. 18, No. 2, Apr. 2000, pp. 140-170.

Microsoft Computer Dictionary, 5th Edition, Microsoft Press, Redmond, WA, 2002, pp. 67-68.

Random House Webster's College Dictionary, Random House, New York, NY, Apr. 2000, pp. 25 and 1429.

U.S. Appl. No. 61/805,513, filed Mar. 26, 2013, Barinov.

Robert Koeten, et al; Systems and Methods for Automated Aggregation of Information-Source Metadata; U.S. Appl. No. 14/561,244, filed Dec. 5, 2014.

Ynn-Pyng Anker Tsaur; Systems and Methods for Securely Storing Backup Data While Facilitating Fast Failovers; U.S. Appl. No. 13/656,536, filed Oct. 19, 2012.

Carey Nachenberg; Systems and Methods for Detecting Malicious Files; U.S. Appl. No. 13/715,265, filed Dec. 14, 2012.

Sudhakar Paulzagade, et al; Systems and Methods for Modifying Track Logs During Restore Processes; U.S. Appl. No. 14/283,742, filed May 21, 2014.

Aeham Abushwashi; Systems and Methods for Maintaining Aggregate Tables in Databases; U.S. Appl. No. 14/447,619, filed Jul. 31, 2014.

Lagoze, Carl et al., "Metadata aggregation and "automated digital libraries": A retrospective on the NSDL experience", http://arxiv.org/ftp/cs/papers/0601/0601125.pdf, as accessed May 1, 2014, (2006).

Steve A. Vranyes, et al; Systems and Methods for Aggregating Information-Asset Metadata from Multiple Disparate Data-Management Systems; U.S. Appl. No. 14/483,133, filed Sep. 10, 2014.

"IF4IT, The International Foundation for Information Technology", http://www.if4it.com/SYNTHESIZED/DISCIPLINES/Information_Asset_Management_Home_Page.html, as accessed May 1, 2014, (2009).

Soares, Sunil "Big Data Governance", http://dama-ny.com/images/meeting/101713/Presentation_deck/damanyc_bigdatagovernance17_october_2013.pdf, as accessed May 1, 2014, Information Asset, LLC, (Oct. 17, 2013).

"IAPMS (Information Asset Portfolio Management System)", http://www.iapms-home.com/, as accessed May 1, 2014, (2012).

"Streamline E-Discovery Collections Management Process", http://falcondiscovery.com/resources/case-studies/streamline-ediscovery-collections-management-process-2/, as accessed May 1, 2014, Falcon Discovery, (Oct. 6, 2011).

"ediscovery.com", http://www.ediscovery.com/eu/solutions/collect/, as accessed May 1, 2014, Kroll Ontrack Inc., (2014).

"Corporations Optimize Cost-effective E-discovery", http://www.hds.com/assets/pdf/hitachi-corporations-optimize-cost-effective-e-discovery.pdf, as accessed May 1, 2014, Solution Profile, Hitachi Data Systems Corporation, (Jan. 2012).

"Optimizing Resources for Efficient eDiscovery", http://www.novitex.com/pdfs/white-papers/White-Paper_Legal_Efficient%20eDiscovery_PBMS00101.pdf, as accessed May 1, 2014, White Paper, Pitney Bowes Inc., (2012).

"HP Autonomy", http://www.autonomy.com/, as accessed May 1, 2014, Hewlett-Packard, (Oct. 29, 1996).

"CommVault® Simpana Software", http://www.commvault.com/simpana-software, as accessed May 1, 2014, (Jul. 5, 2012).

"Proofpoint", http://www.proofpoint.com/, as accessed May 1, 2014, (Nov. 28, 2001).

"Nuix", http://www.nuix.com/, as accessed May 1, 2014, (Jan. 7, 2007).

"Varonis", http://www.varonis.com/, as accessed May 1, 2014, (Aug. 31, 2004).

"InfoSphere Platform", http://www-01.ibm.com/software/data/infosphere/, as accessed May 1, 2014, IBM,(Jan. 8, 2009).

"Acaveo", http://www.acaveo.com/, as accessed May 1, 2014, (Feb. 2, 2011).

"ZyLAB", http://www.zylab.com/, as accessed May 1, 2014, (Dec. 29, 1996).

(56) References Cited

OTHER PUBLICATIONS

"Imperva", http://www.imperva.com/, as accessed May 1, 2014, (Feb. 16, 2004).
"NTP Software", http://www.ntpsoftware.com/, as accessed May 1, 2014, (Dec. 20, 1996).
"APTARE", http://www.aptare.com/, as accessed May 1, 2014, (1993).
"TITUS", http://www.titus.com/, as accessed May 1, 2014, (Dec. 7, 1998).
"Index Engines", http://www.indexengines.com/, as accessed May 1, 2014, (Mar. 20, 2004).
"Duplicate Image Finder", http://www.alldup.de/delete_duplicate_files/duplicate_image_finder.htm, as accessed May 1, 2014, AllDup, Michael Thummerer Software Design, (2000).
V.Laurie, "Best Free Duplicate File Remover", http://www.techsupportalert.com/best-free-duplicate-file-remover.htm, as accessed May 1, 2014, (Jul. 4, 2014).
"CloneSpy", http://www.clonespy.com/, as accessed May 1, 2014, (Aug. 5, 2001).
"Symantec Data Insight", http://www.symantec.com/data-insight, as accessed May 1, 2014, Symantec Corporation, (1995).
Michael Main, et al., Data Structures & Other Objects Using C++, 2nd Edition, Addison Wesley, Boston, MA, 2001, pp. 91-92.
Tim Haynes; Systems and Methods for Navigating Through a Hierarchy of Nodes Stored in a Database; U.S. Appl. No. 14/480,558, filed Sep. 8, 2014.
Tim Haynes, et al; Systems and Methods for Organizing Multi-Faceted Sets of Data; U.S. Appl. No. 14/480,560, filed Sep. 8, 2014.
SQL, http://en.wikipedia.org/wiki/SQL, as accessed May 1, 2014, Wikipedia, (Jan. 1, 2004).
"Relational database management system", http://en.wikipedia.org/wiki/Relational_database_management_system, as accessed May 1, 2014, Wikipedia, (Dec. 18, 2003).
"The four categories of NoSQL databases", http://rebelic.nl/2011/05/28/the-four-categories-of-nosql-databases/, as accessed May 1, 2014, (Aug. 2, 2013).
Alok Dwivedi, et al; Systems and Methods for Automatically Translating Data Records; U.S. Appl. No. 14/540,171, filed Nov. 13, 2014.
Robert Koeten; Systems and Methods for Aggregating Information-Asset Classifications; U.S. Appl. No. 14/542,165, filed Nov. 14, 2014.
"BigQuery in Practice: Loading Data Sets That are Terabytes and Beyond", https://cloud.google.com/developers/articles/bigquery-in-practice/, as accessed May 1, 2014, (Feb. 27, 2014).
Stockinger, Kurt et al., "Query-Driven Visualization of Large Data Sets", http://www.researchgate.net/publication/200084949_Query-Driven_Visualization_of_Large_Data_Sets, as accessed May 1, 2014, Visualization, 2005, VIS 05, IEEE, (2005).
"Apache Spark—a Fast Big Data Analytics Engine", https://bighadoop.wordpress.com/2014/04/03/apache-spark-a-fast-big-data-analytics-engine/, as accessed May 1, 2014, (Apr. 3, 2014).
"Improving Database Query Performance", http://kb.tableausoftware.com/articles/knowledgebase/database-query-performance, as accessed May 1, 2014, (Dec. 19, 2011).
"Collaborative filtering", http://en.wikipedia.org/wiki/Collaborative_filtering, as accessed May 1, 2014, Wikipedia, (Apr. 27, 2004).
Keyser, Chris "Optimizing for Star Schemas on Amazon Redshift", http://aws.amazon.com/articles/8341516668711341, as accessed May 1, 2014, Amazon Web Services, Inc., (Dec. 31, 2013).

\* cited by examiner

SYSTEMS AND METHODS FOR UTILIZING INFORMATION-ASSET METADATA AGGREGATED FROM MULTIPLE DISPARATE DATA-MANAGEMENT SYSTEMS

CROSS REFERENCE TO RELATED APPLICATION

This application claims priority to U.S. Provisional Application No. 61/988,213, titled "SYSTEMS AND METHODS FOR AGGREGATING DISPARATE INFORMATION ASSETS SOURCED BY MULTIPLE COLLECTORS AND DATA MANAGEMENT SOLUTIONS" and filed 4 May 2014, the disclosure of which is incorporated, in its entirety, by this reference.

BACKGROUND

In the digital age, organizations and other entities may manage increasingly large volumes of information assets (e.g. files, emails, etc.). Some organizations may deploy extensive data-management infrastructures for storing, organizing, protecting, and accessing their information assets. A typical organization's data-management infrastructure may include various data-management systems that enable the organization to search, identify, collect, and review the information assets that are stored across a variety of sources in the organization's IT infrastructure (e.g., personal computing devices, file servers, application servers, email servers, document repositories, collaboration systems, social networks, cloud-based storage services, etc.). For example, an organization may deploy an electronic-discovery system that enables the organization to search, identify, collect, and review its information assets as part of early case assessment in an electronic-discovery case.

Unfortunately, using conventional data-management systems to search for, identify, collect, and/or review a particular subset of an organization's information assets (e.g., the information assets of a particular custodian or information assets that have a particular classification) that are stored across a large number of disparate sources may present unwanted limitations. For example, conventional electronic-discovery systems may consume a considerable amount of time scanning information-asset sources within an organization's IT infrastructure in order to build an index of information assets and their metadata (e.g., ownership attributes, location attributes, classifications, etc.) against which a particular information-asset search may be performed.

In addition, the information-asset searches that are performed by conventional electronic-discovery systems may be error prone because the indexes of conventional electronic-discovery systems often do not include all information assets within an organization's IT infrastructure (e.g., as a result of a missed information-asset source) and/or all necessary information-asset metadata for performing searches (e.g., as a result of some information-asset metadata being unavailable via certain information-asset sources). Accordingly, the instant disclosure identifies and addresses a need for additional and improved systems and methods for aggregating and utilizing information-asset metadata from multiple disparate data-management systems.

SUMMARY

As will be described in greater detail below, the instant disclosure describes various systems and methods for aggregating and utilizing information-asset metadata from multiple disparate data-management systems. In one example, a computer-implemented method for utilizing information-asset metadata aggregated from multiple disparate data-management systems may include (1) receiving a request for information about one or more information assets of an entity whose metadata satisfies a metadata-search criterion, (2) identifying a global metadata repository that stores metadata of the information assets, (3) querying the global metadata repository for information about one or more of the information assets whose metadata satisfies the metadata-search criterion, (4) receiving, from the global metadata repository, information about at least one information asset whose metadata satisfies the metadata-search criterion, and (5) responding to the request using the information about the information asset.

In some embodiments, the information assets of the entity may be managed by a first data-management system that manages a portion of the information assets in a first domain and a second data-management system that manages a portion of the information assets in a second domain that is separate and distinct from the first domain. In at least one embodiment, the global metadata repository may be separate and distinct from the first data-management system and the second data-management system, and the metadata of the information assets stored in the global metadata repository may have been collected from and generated by the first data-management system and/or the second data-management system.

In one embodiment, the information assets of the entity may be accessible via several information-asset sources, and the steps of receiving the request, identifying the global metadata repository, querying the global metadata repository, receiving the information, and responding to the request may be performed without scanning any of the information-asset sources.

In one embodiment, the information assets of the entity may be distributed across several information-asset sources, and the steps of receiving the request, identifying the global metadata repository, querying the global metadata repository, receiving the information, and responding to the request may be performed by an electronic-discovery system as part of an early case assessment without scanning any of the information-asset sources.

In one embodiment, the metadata of the information assets stored in the global metadata repository may identify an owner of each of the information assets, the first data-management system and/or the second data-management system may have generated the metadata of the information assets stored in the global metadata repository that identifies the owner of each of the information assets, and the metadata-search criterion may include a criterion for identifying information assets of at least one specified owner.

In one embodiment, the metadata of the information assets stored in the global metadata repository may include at least one classification of at least one of the information assets, the first data-management system and/or the second data-management system may have generated the classification of the at least one of the information assets, and the metadata-search criterion may include a criterion for identifying information assets whose classification matches at least one specified classification.

In some examples, the step of querying the global metadata repository for information may include registering, with the global metadata repository, to receive a notification whenever the metadata of any of the information assets subsequently satisfies the metadata-search criterion as a result of being updated by at least one of the first data-management system and the second data-management system.

In one embodiment, the information asset may be accessible via an information-asset source, the step of receiving the request for information about one or more information assets of the entity whose metadata satisfies the metadata-search criterion may include receiving a request for one or more information assets of the entity whose metadata satisfies the metadata-search criterion, and the step of responding to the request may include (1) using the information about the information asset to retrieve the information asset from the information-asset source and (2) responding to the request with the information asset.

In one embodiment, the information asset may be accessible via an information-asset source, the step of receiving the request for information about one or more information assets of the entity whose metadata satisfies the metadata-search criterion may include receiving a request for one or more information assets of the entity whose metadata satisfies the metadata-search criterion, the step of querying the global metadata repository may include requesting the information asset from the global metadata repository, the step of receiving the information about the information asset may include receiving, from the global metadata repository, the information asset, and the step of responding to the request may include responding to the request with the information asset. In at least one embodiment, the information asset received from the global metadata repository may have been retrieved from the information-asset source by the global metadata repository.

In one embodiment, the information assets of the entity may be distributed across several information-asset sources that include a file server, a mail server, a document server, a collaboration system, a social network, and/or a cloud-based storage system. In at least one embodiment, the information asset may include a file, an email, and/or a document.

In one embodiment, a system for implementing the above-described method may include (1) a request-receiving module, stored in memory, that receives a request for information about one or more information assets of an entity whose metadata satisfies a metadata-search criterion, (2) an identifying module, stored in memory, that identifies a global metadata repository that stores metadata of the information assets, (3) a querying module, stored in memory, that queries the global metadata repository for information about one or more of the information assets whose metadata satisfies the metadata-search criterion, (4) an information-receiving module that receives, from the global metadata repository, information about at least one information asset whose metadata satisfies the metadata-search criterion, (5) a responding module, stored in memory, that responds to the request using the information about the information asset, and (6) at least one physical processor configured to execute the request-receiving module, the identifying module, the querying module, the information-receiving module, and the responding module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request for information about one or more information assets of an entity whose metadata satisfies a metadata-search criterion, (2) identify a global metadata repository that stores metadata of the information assets, (3) query the global metadata repository for information about one or more of the information assets whose metadata satisfies the metadata-search criterion, (4) receive, from the global metadata repository, information about at least one information asset whose metadata satisfies the metadata-search criterion, and (5) respond to the request using the information about the information asset.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
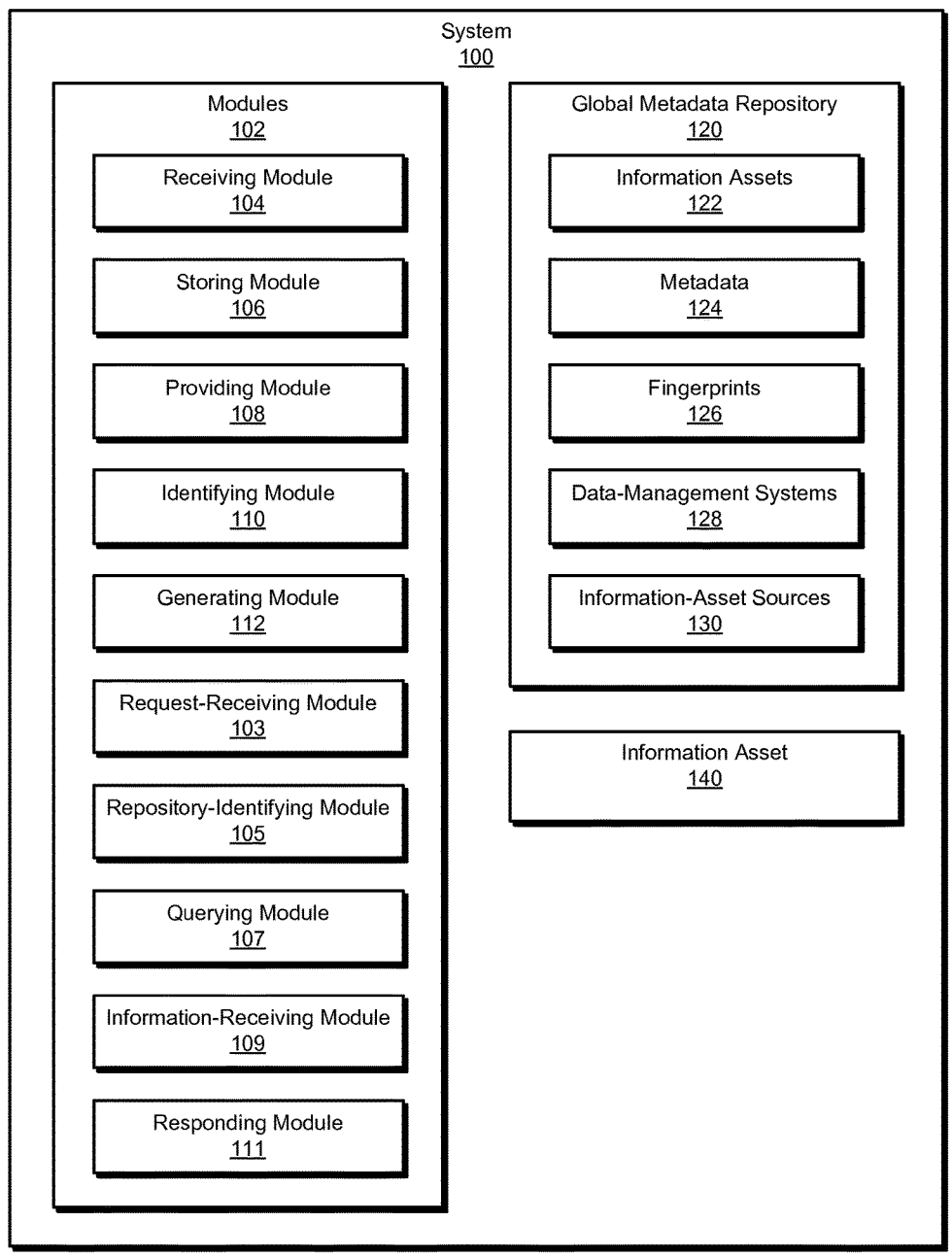
FIG. 1 is a block diagram of an exemplary system for utilizing information-asset metadata aggregated from multiple disparate data-management systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for utilizing information-asset metadata aggregated from multiple disparate data-management systems. As will be explained in greater detail below, by aggregating information-asset metadata of an entity's information assets from multiple disparate data-management systems into a single global metadata repository, the systems and methods described herein may provide a normalized, unified, and consistent view of the entity's information assets to one or more data-management systems (such as, e.g., an electronic-discovery system). In one example, the systems and methods described herein may aggregate information-asset metadata into a single global metadata repository by enabling disparate data-management systems to contribute their knowledge about the information assets to the global metadata repository.

Moreover, by creating the global metadata repository, the systems and methods described herein may enable data-management systems to gain, from a single source, a complete understanding of the organization's information assets and how the information assets are and should be managed. Furthermore, by enabling disparate data-management systems to access and enrich a global metadata repository, the systems and methods described herein may enable data-management systems to efficiently share metadata such that (1) at least one data-management system may be able to discover an entity's information assets that exist across multiple sources without scanning the sources themselves, (2) valuable knowledge about information assets may be shared amongst several data-management systems (e.g., knowledge indicating that an asset is sensitive or valuable), and (3) duplications of effort may be reduced or eliminated. For example, by using a global metadata repository that already contains metadata of all or a portion of an entity's information assets, a data-management system may identify, collect, and/or review a particular subset of the entity's information assets without needing to scan the sources of the entity's information assets and/or without needing to independently generate some or all of the metadata required to identify the subset of the entity's information assets. Embodiments of the instant disclosure may also provide various other advantages and features, as discussed in greater detail below.

Figure 2:
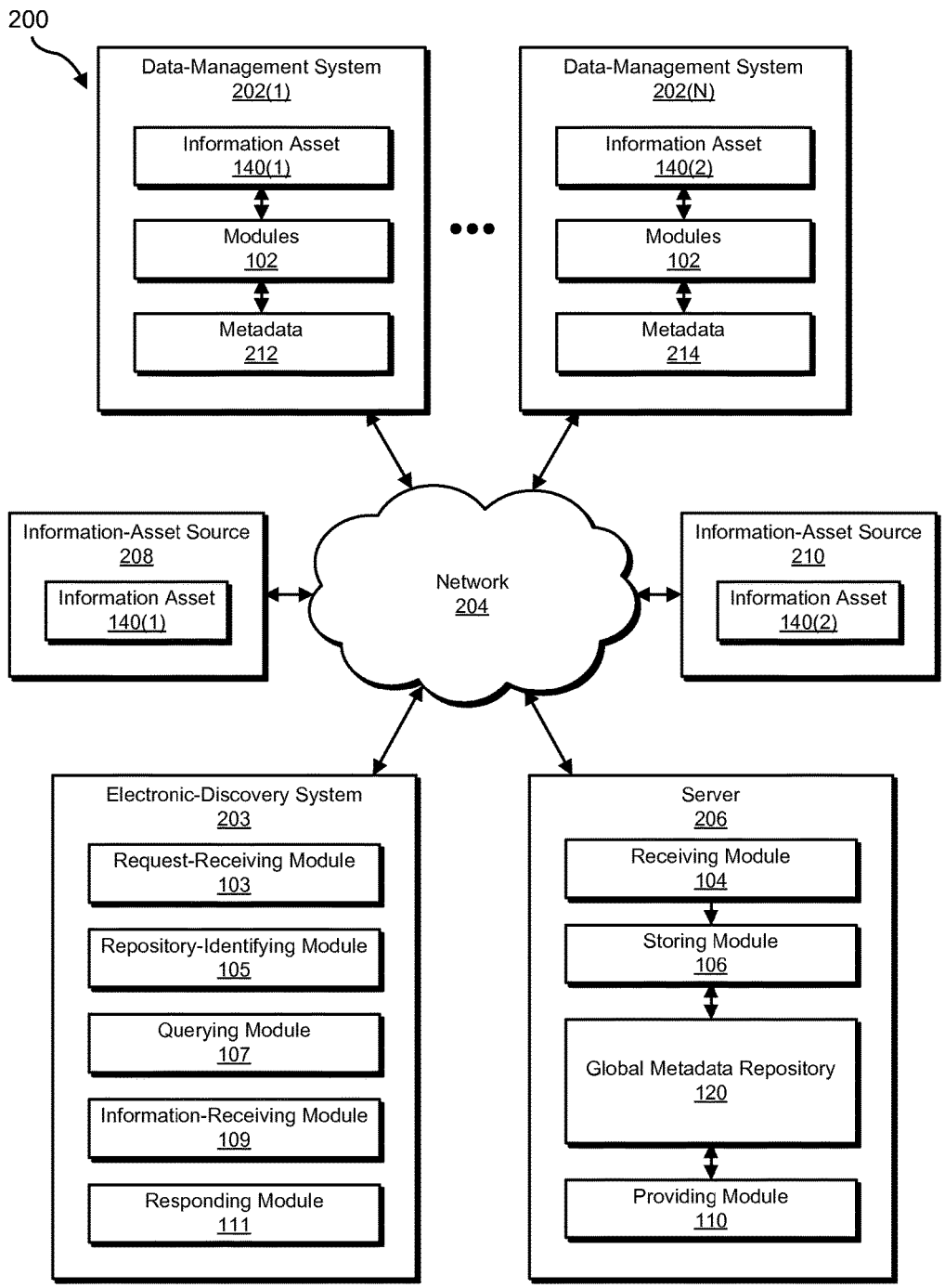
FIG. 2 is a block diagram of an additional exemplary system for utilizing information-asset metadata aggregated from multiple disparate data-management systems.

The following will provide, with reference to FIGS. 1-2, detailed descriptions of exemplary systems for utilizing information-asset metadata aggregated from multiple disparate data-management systems. Detailed descriptions of corresponding computer-implemented methods will also be provided in connection with FIGS. 3-13. In addition, detailed descriptions of an exemplary computing system and network architecture capable of implementing one or more of the embodiments described herein will be provided in connection with FIGS. 14 and 15, respectively.

FIG. 1 is a block diagram of an exemplary system 100 for utilizing information-asset metadata aggregated from multiple disparate data-management systems. As illustrated in this figure, exemplary system 100 may include one or more modules 102 for performing one or more tasks. For example, and as will be explained in greater detail below, exemplary system 100 may include a receiving module 104 that may (1) receive a first instance of metadata of an information asset from a first data-management system that manages information assets of an entity in a first domain and (2) receive a second instance of metadata of the information asset from a second data-management system that manages the information assets of the entity in a second domain that is separate and distinct from the first domain. Exemplary system 100 may also include a storing module 106 that may store the first and second instances of metadata in a global metadata repository that is separate and distinct from the first and second data-management systems such that the first and second instances of metadata are associated with the information asset. Exemplary system 100 may also include a providing module 108 that may provide access to the first and second instances of metadata stored in the global metadata repository to the first data-management system, the second data-management system, and/or the entity.

In addition, and as will be described in greater detail below, exemplary system 100 may include an identifying module 110 that may identify, at the first data-management system, an information asset. Exemplary system 100 may additionally include a generating module 112 that may generate, at the first data-management system, the first instance of metadata.

As illustrated in FIG. 1, exemplary system 100 may also include a request-receiving module 103 that may receive a request for information about one or more information assets of an entity whose metadata satisfies a metadata-search criterion. Exemplary system 100 may additionally include a repository-identifying module 105 that may identify a global metadata repository that stores metadata of the information assets. Exemplary system 100 may also include a querying module 107 that may query the global metadata repository for information about one or more of the information assets whose metadata satisfies the metadata-search criterion. Exemplary system 100 may also include an information-receiving module 109 that may receive, from the global metadata repository, information about at least one information asset whose metadata satisfies the metadata-search criterion. Exemplary system 100 may additionally include a responding module 111 that may respond to the request using the information about the information asset. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., data-management systems 202(1)-(N), electronic-discovery system 203, server 206, and/or information-asset sources 208 and 210), computing system 1410 in FIG. 14, and/or portions of exemplary network architecture 1500 in FIG. 15. One or more of modules 102 in FIG. 1 may also represent all or portions of one or more special-purpose computers configured to perform one or more tasks.

As illustrated in FIG. 1, exemplary system 100 may also include a global metadata repository 120 and one or more information assets, such as information asset 140. In one example, global metadata repository 120 may store a representation of one or more information assets (e.g., information assets 122), metadata of one or more information assets (e.g., metadata 124), fingerprints of one or more information assets (e.g., fingerprints 126), information about one or more data-management systems (e.g., data-management systems 128), and/or information about one or more sources of information assets (e.g., information-asset sources 130).

Global metadata repository 120 generally represents a single logical repository of metadata. In some embodiments, global metadata repository 120 may represent portions of a single database or computing device or a plurality of databases or computing devices. For example, global metadata repository 120 may represent a portion of server 206 in FIG. 2, computing system 1410 in FIG. 14, and/or portions of exemplary network architecture 1500 in FIG. 15. Alternatively, global metadata repository 120 in FIG. 1 may represent one or more physically separate devices capable of being accessed by a computing device, such as data-management systems 202(1)-(N), electronic-discovery system 203, server 206, and/or information-asset sources 208 and 210 in FIG. 2, computing system 1410 in FIG. 14, and/or portions of exemplary network architecture 1500 in FIG. 15. In some examples, global metadata repository 120 may represent a noSQL database such as CASSANDRA, HADOOP, MONGODB, and/or any other suitable type or form of noSQL database. As used herein, the term "noSQL database" generally refers to a database that models data in structures other than tabular relations. NoSQL databases may include databases that provide wide column stores, document stores, key value stores, graphical relationships, object relationships, tabular relationships, and/or various other storage technologies.

Exemplary system 100 in FIG. 1 may be implemented in a variety of ways. For example, all or a portion of exemplary system 100 may represent portions of exemplary system 200 in FIG. 2. As shown in FIG. 2, system 200 may include data-management systems 202(1)-(N), an electronic-discovery system 203, a server 206, and information-asset sources 208 and 210 in communication via a network 204. In one example, data-management systems 202(1)-(N) may be programmed with one or more of modules 102 and/or may store all or a portion of the data in global metadata repository 120. Additionally or alternatively, server 206 may be programmed with one or more of modules 102 and/or may store all or a portion of the data in global metadata repository 120. In at least one example, electronic-discovery system 203 may be programmed with one or more of modules 102 and/or may store all or a portion of the data in global metadata repository 120.

In one embodiment, one or more of modules 102 from FIG. 1 may, when executed by at least one processor of data-management systems 202(1)-(N), electronic-discovery system 203, and/or server 206, enable data-management systems 202(1)-(N), electronic-discovery system 203, and/or server 206 to aggregate and utilize information-asset metadata from data-management systems 202(1)-(N). For example, and as will be described in greater detail below, identifying module 110 may, as part of data-management system 202(1) that manages information asset 140 in a first domain, identify information asset 140(1) (e.g., an instance of information asset 140 stored to information-asset source 208). Generating module 112 may then, as part of data-management system 202(1), generate metadata 212 of information asset 140(1). Similarly, identifying module 110 may, as part of data-management system 202(N) that manages information asset 140 in a second domain, identify information asset 140(2) (e.g., another instance of information asset 140 stored to information-asset source 210). Generating module 112 may then, as part of data-management system 202(N), generate metadata 214 of information asset 140(2).

Figure 5:
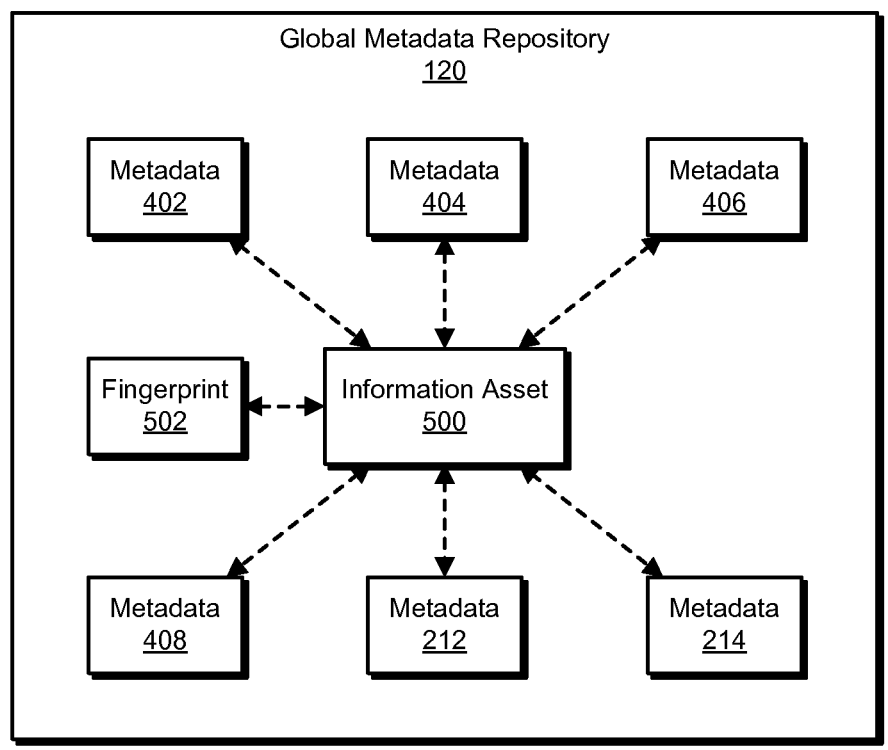
FIG. 5 is a block diagram of an exemplary global metadata repository.
Figure 6:
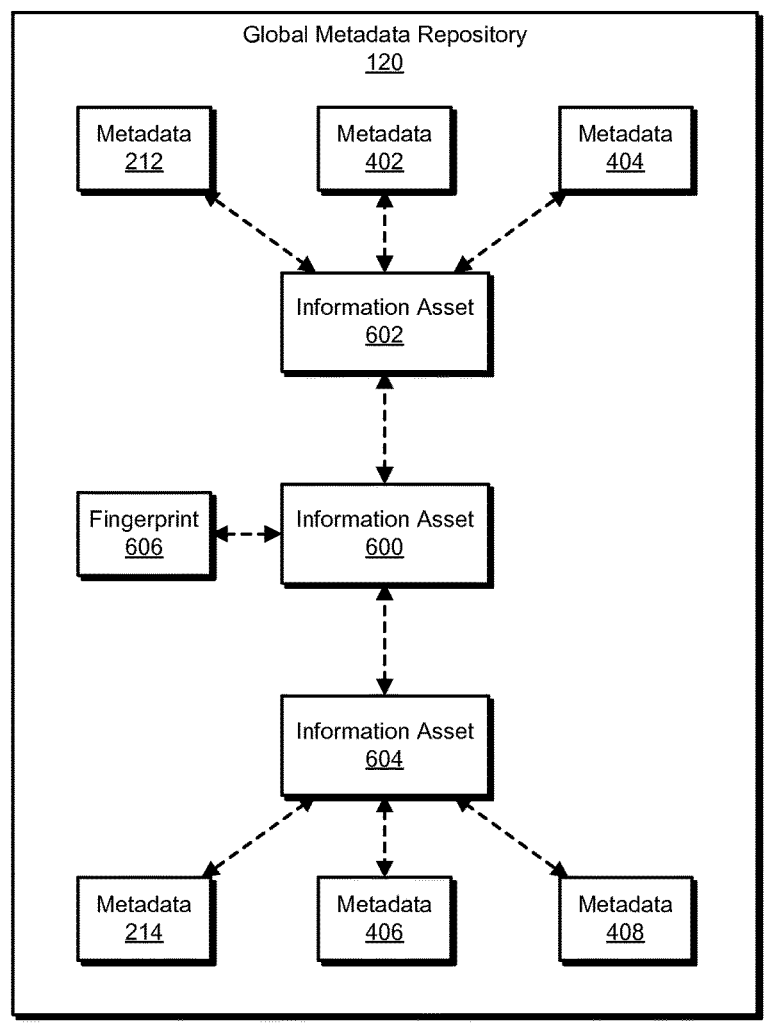
FIG. 6 is a block diagram of an exemplary global metadata repository.
Figure 7:
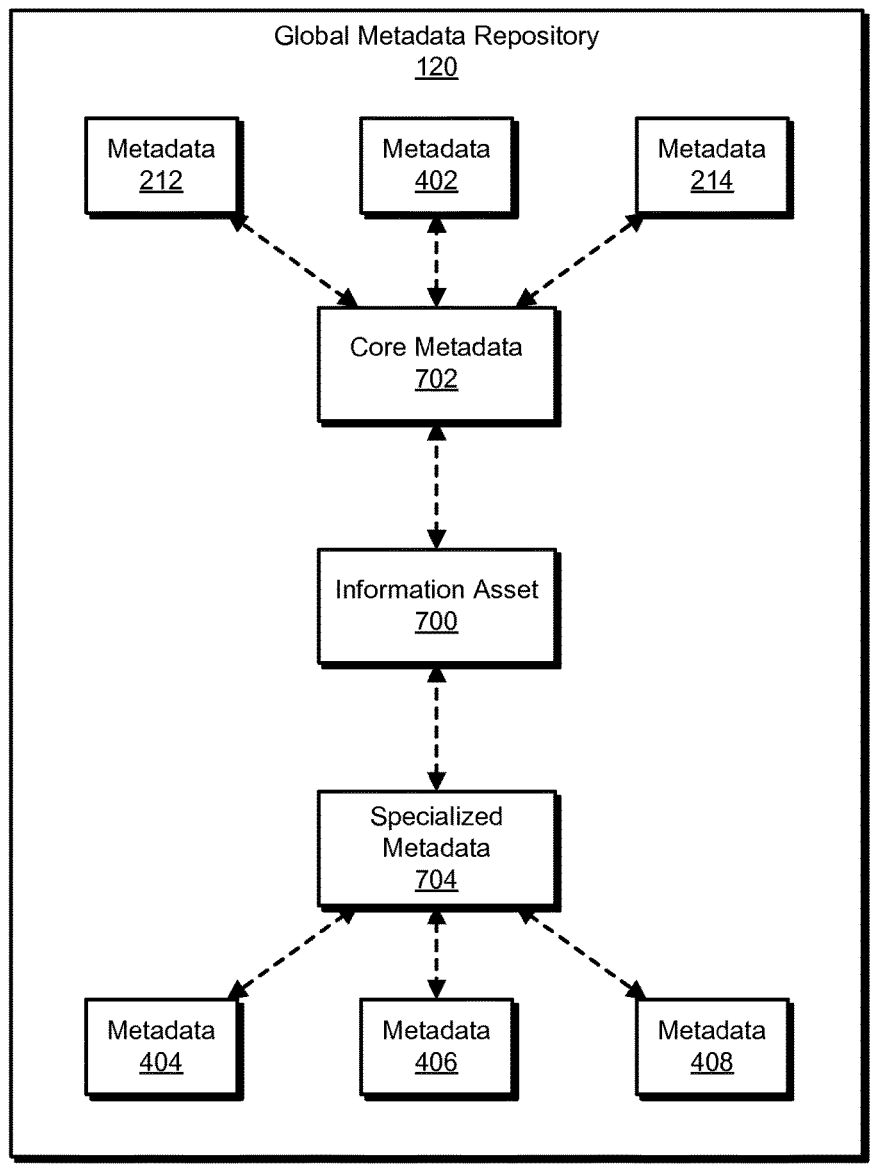
FIG. 7 is a block diagram of an exemplary global metadata repository.

Receiving module 104 may, as part of server 206, receive metadata 212 from data-management system 202(1) and metadata 214 from data-management system 202(N). Storing module 106 may then, as part of server 206, store metadata 212 and 214 in global metadata repository 120 that is separate and distinct from data-management systems 202(1)-(N) such that metadata 212 and 214 are associated with information asset 140 (e.g., as illustrated in FIGS. 5-7). Providing module 108 may provide access to metadata 212 and 214 to one or more of data-management system 202(1)-(N) and electronic-discovery system 203.

Figure 11:
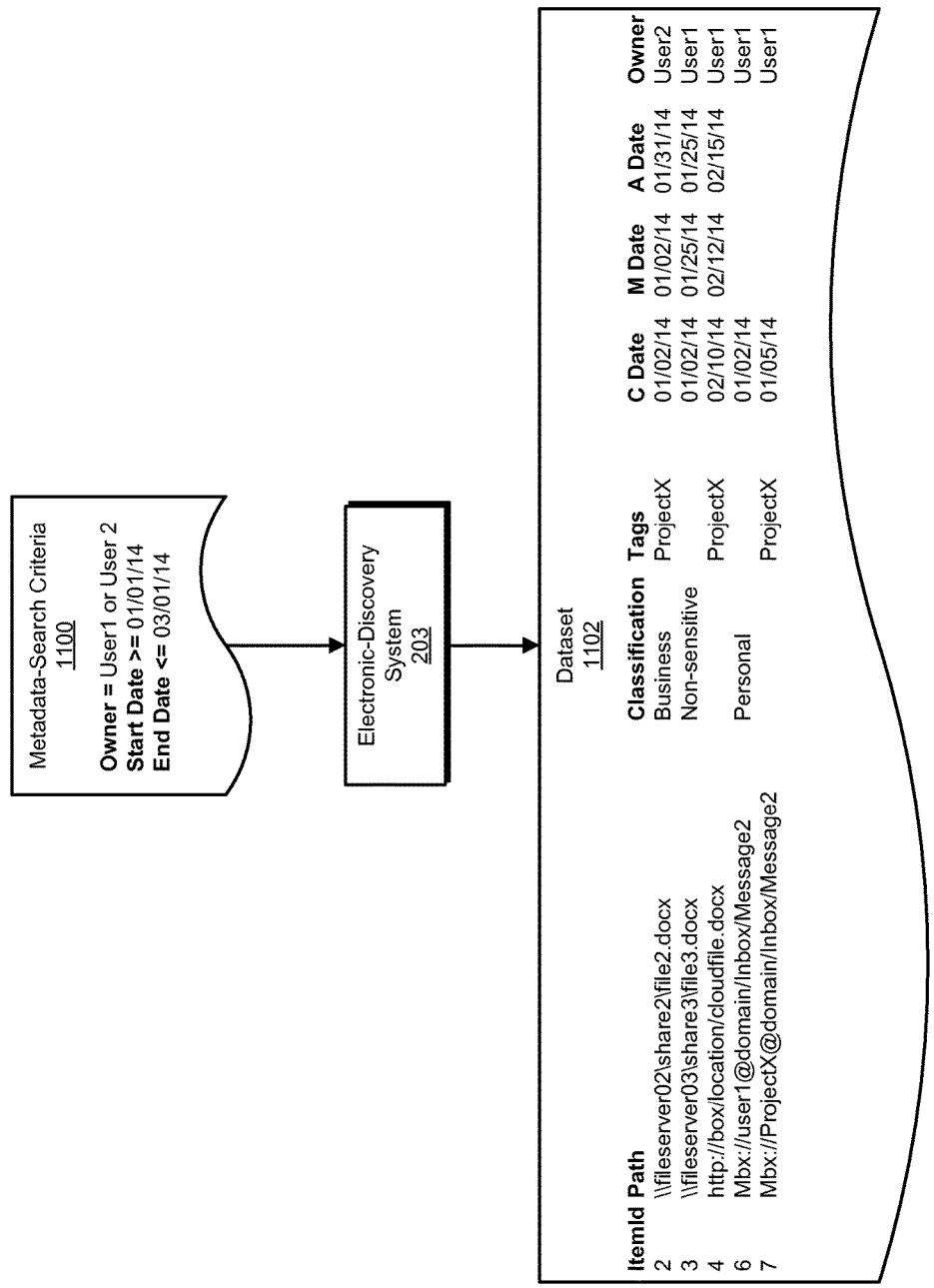
FIG. 11 is a flow diagram of an exemplary information-asset search.
Figure 12:
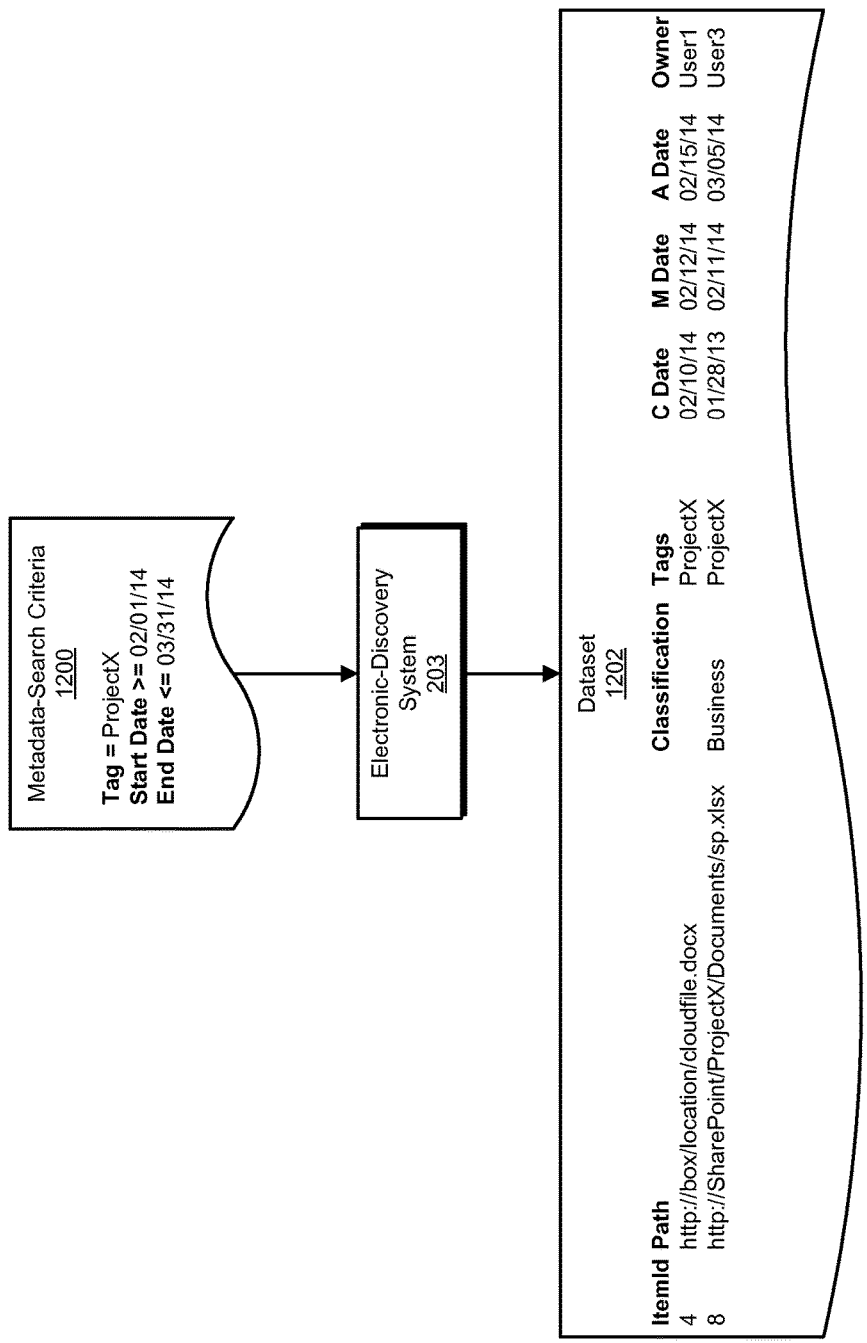
FIG. 12 is a flow diagram of an exemplary information-asset search.
Figure 13:
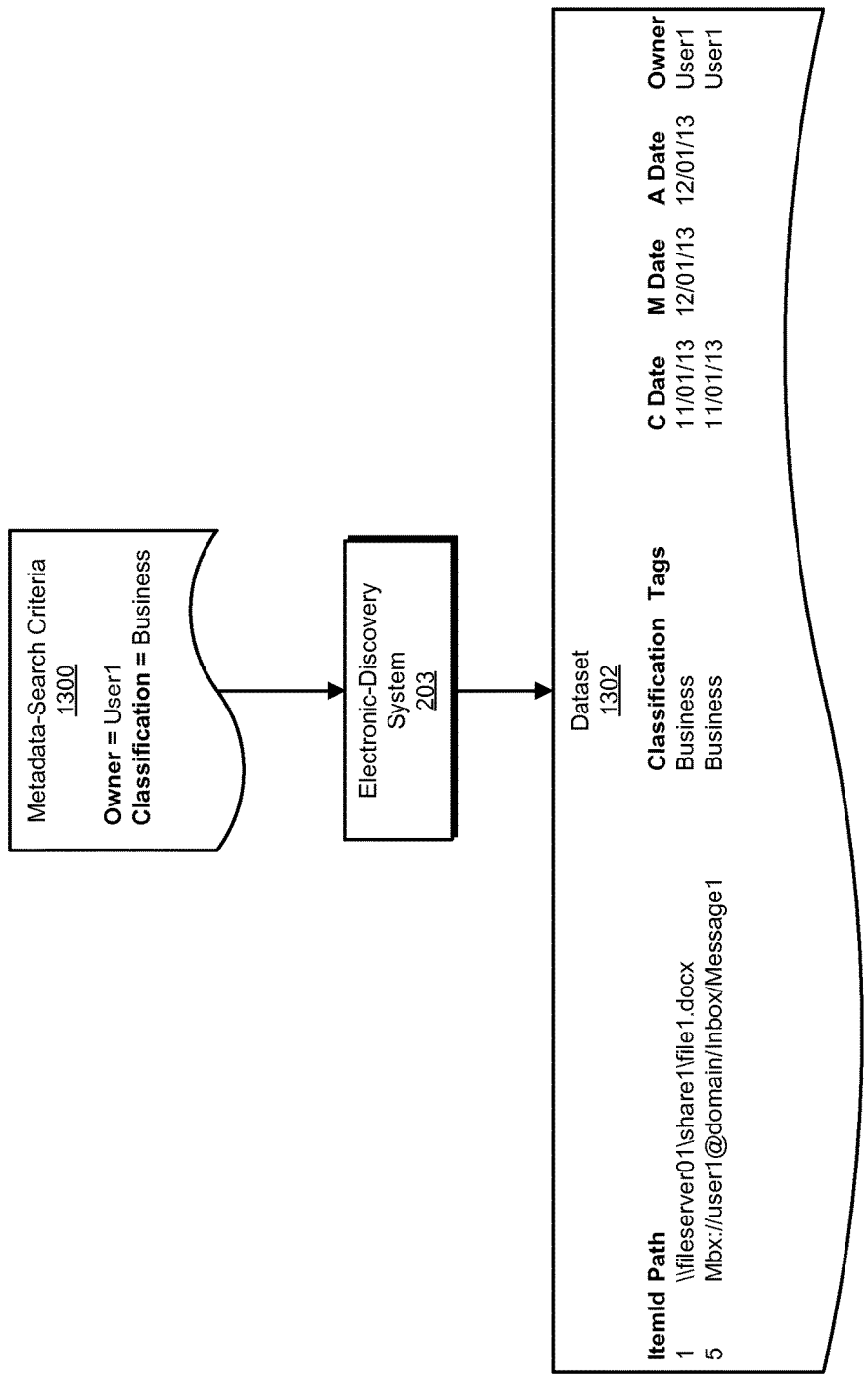
FIG. 13 is a flow diagram of an exemplary information-asset search.

In one example, request-receiving module 103 may, as part of electronic-discovery system 203, receive a request for information about information assets stored to information-asset sources 208 and 210 whose metadata satisfies a metadata-search criterion (such as the metadata-search criteria illustrated in FIGS. 11-13). Repository-identifying module 105 may, as part of electronic-discovery system 203, identify global metadata repository 120 that stores metadata of the information assets stored to information-asset sources 208 and 210. Querying module 107 may, as part of electronic-discovery system 203, query global metadata repository 120 for information about one or more of the information assets whose metadata satisfies the metadata-search criterion. Information-receiving module 109 may receive, from global metadata repository 120 and as part of electronic-discovery system 203, information about at least one information asset whose metadata satisfies the metadata-search criterion. Responding module 111 may, as part of electronic-discovery system 203, respond to the request using the information about the information asset.

Data-management systems 202(1)-(N) and electronic-discovery system 203 generally represent any type or form of computing device that is capable of reading computer-executable instructions and/or performing data-management operations. Server 206 generally represents any type or form of computing device that is capable of reading computer-executable instructions and/or managing a global metadata repository. Examples of data-management systems 202(1)-(N), electronic-discovery system 203, and server 206 include, without limitation, application servers and database servers configured to provide various database services and/or run certain software applications. In at least one example, electronic-discovery system 203 may represent a computing system that provides various electronic-discovery services (e.g., early-case-assessment services).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1500 in FIG. 15, or the like. Network 204 may facilitate communication or data transfer using wireless or wired connections. In one embodiment, network 204 may facilitate communication between data-management systems 202(1)-(N), electronic-discovery system 203, server 206, and information-asset sources 208 and 210.

Information-asset sources 208 and 210 generally represent any type or form of computing device capable of reading computer-executable instructions and/or any type or form of storage device or system capable of storing and/or managing data. Examples of information-asset sources 208 and 210 include, without limitation, application servers, file servers, email servers, web servers, computing system 1410 in FIG. 14, and/or portions of exemplary network architecture 1500 in FIG. 15.

Figure 3:
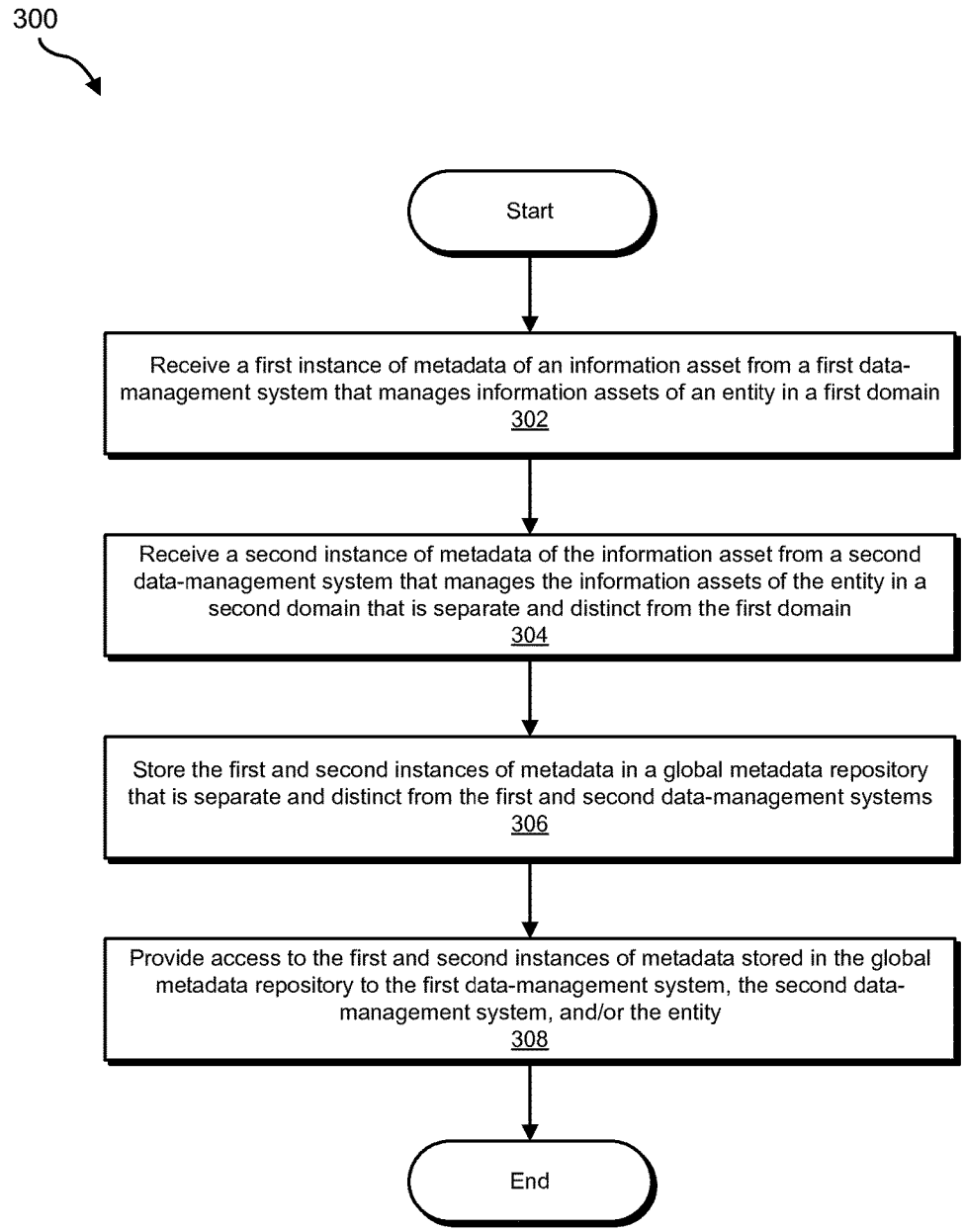
FIG. 3 is a flow diagram of an exemplary method for utilizing information-asset metadata aggregated from multiple disparate data-management systems.

FIG. 3 is a flow diagram of an exemplary computer-implemented method 300 for utilizing information-asset metadata aggregated from multiple disparate data-management systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1410 in FIG. 14, and/or portions of exemplary network architecture 1500 in FIG. 15.

As illustrated in FIG. 3, at step 302 one or more of the systems described herein may receive a first instance of metadata of an information asset from a first data-management system that manages information assets of an entity in a first domain. For example, receiving module 104 may, as part of server 206 in FIG. 2, receive metadata 212 of information asset 140 from data-management system 202(1) that manages information assets stored to information-asset source 208.

Receiving module 104 may receive information-asset metadata from a variety of data-management systems that manage an entity's information assets. As used herein, the term "data-management system" generally refers to any system or device that manages information assets and/or generates metadata of information assets. Examples of data-management systems include, without limitation, systems that protect, organize, and/or store information assets (e.g., file systems, email systems, document systems, storage systems, backup systems, archival systems, replication systems, high-availability systems, data-search systems, data-lifecycle-management systems, and virtualization systems) and systems that control access to information assets (e.g., data-loss-prevention systems, identity-authentication systems, access-control systems, encryption systems, policy-compliance systems, risk-reduction systems, intrusion-prevention systems, unstructured-data-governance systems, and electronic-discovery systems). In some examples, the term "data-management system" may refer to a cloud-computing environment that provides various data-management services via the Internet. As used herein, the term "entity" generally refers to any organization (e.g., a business or government unit), individual, group of related individuals, department within an organization, computing device, collection of computing devices, or computing system.

Data-management systems may manage a variety of information assets in a variety of domains. As used herein, the term "information asset" generally refers to any discrete or aggregated representation of electronic information. In some examples, the term "information asset" may refer to any structured, semi-structured, or unstructured information. Examples of information assets include, without limitation, files, emails, documents, messages, databases, database tables, containers, folders, backups, disks, database servers, mail servers, and mailboxes. An entity's information assets may be stored across a variety of information-asset sources (e.g., personal computing devices, file servers, application servers, email servers, document repositories, collaboration systems, social networks, and cloud-based storage services).

As part of managing information assets, data-management systems may generate and maintain a variety of information-asset metadata. As used herein, the term "metadata" generally refers to any data that describes the characteristics or attributes of an information asset. Examples of metadata include, without limitation, names, data types, ages, creation attributes, access attributes, modification attributes, size attributes, location attributes, relationship attributes, usage attributes, ownership attributes, reputation attributes, permission attributes, classifications, tags, fingerprints, and life-cycle attributes.

In some examples, the term "metadata" may refer to characteristics or attributes of the content of an information asset but not the content itself. For example, metadata of a text document may include a number of words contained in the text document but not the words themselves. Similarly, the term "metadata" may refer to characteristics or attributes of an information asset that have been generated from the content of the information asset but not the content itself. For example, metadata of a text document may include a classification that indicates that the text document includes sensitive information but not the sensitive information itself. In at least one example, the term "metadata" may refer to characteristics or attributes of an information asset that have been generated without examining the content of the information asset. For example, metadata of a text document may include a name, a size, or a data type that has been discovered by a data-management system without examining the content of the text document.

The term "domain," as used herein, generally refers to any area or field of data management. Examples of data-management domains include, without limitation, a file domain, an email domain, a document domain, a storage domain, a backup domain, an archival domain, a replication domain, a high-availability domain, a data-search domain, a virtualization domain, a data-loss-prevention domain, an identity-authentication domain, an access-control domain, an encryption domain, a policy-compliance domain, an intrusion-prevention domain, an unstructured-data-governance domain, an electronic discovery domain, and/or a cloud-computing domain.

In some examples, two data-management systems may be considered to manage information assets in separate and distinct domains if (1) the two data-management systems generate or utilize different sets of information-asset metadata while performing data-management operations, (2) the two data-management systems generate or utilize similar sets of information-asset metadata to perform different data-management operations, or (3) the two data-management systems manage different sets of information assets. For example, a backup system and a data-loss-prevention system may be considered to operate in different domains (e.g., a backup domain and a data-loss-prevention domain, respectively). Similarly, an archiving system that archives files and an archiving system that archives emails may be considered to operate in different domains (e.g., a file domain and an email domain, respectively).

Figure 4:
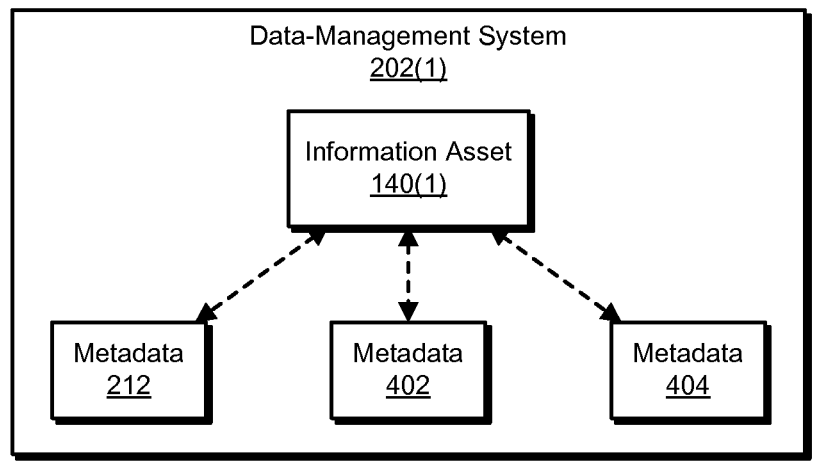
FIG. 4 is a block diagram of exemplary data-management systems.
Figure 4:
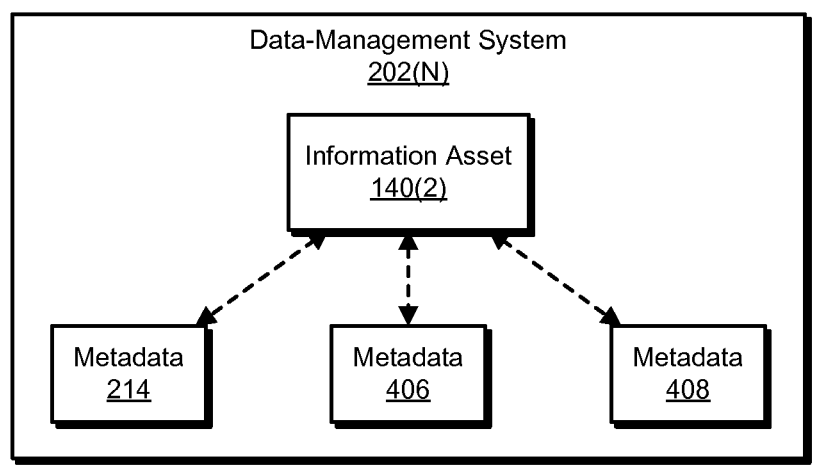

FIG. 4 illustrates two disparate data-management systems that manage instances of information asset 140 (e.g., information asset 140(1) and information asset 140(2)) in separate and distinct domains and that have generated different sets of metadata for information asset 140 while performing data-management operations on the instances of information asset 140. As illustrated in FIG. 4, data-management system 202(1) may have generated metadata 212, metadata 402, and metadata 404 of information asset 140(1), and data-management system 202(N) may have generated metadata 214, metadata 406, and metadata 408 of information asset 140(2). As will be explained in greater detail below, the systems described herein may aggregate the metadata maintained by data-management system 202(1) and the metadata maintained by data-management system 202(N) into a single global metadata repository that may provide a normalized, unified, and consistent view of information asset 140 (e.g., as illustrated in FIGS. 5-7).

Returning to FIG. 3, receiving module 104 may receive metadata from data-management systems in a variety of ways. In one example, receiving module 104 may receive metadata from a data-management system as part of enabling the data-management system to push metadata to a global metadata repository. For example, receiving module 104 may receive metadata from data-management systems via an application programming interface that enables the data-management systems to add and/or update metadata to global metadata repository 120. In at least one example, the application programming interface may enable a data-management system to identify (e.g., using a fingerprint or hash) the information asset to which a particular instance of metadata belongs.

In some examples, receiving module 104 may enable data-management systems to store information-asset metadata to a global metadata repository using a representational state transfer (REST) architecture that provides create, read, update, and delete (CRUD) functionalities. In one example, receiving module 104 may use a RESTful architecture to enable data-management systems to create, read, update, and/or delete records of information assets and metadata within global metadata repository 120.

Additionally or alternatively, receiving module 104 may receive metadata from a data-management system by pulling the metadata from the data-management system. For example, receiving module 104 may receive metadata from a data-management system via an application programming interface of the data-management system that enables receiving module 104 to pull information-asset metadata from the data-management system. In at least one example, an application programming interface of a data-management system may enable receiving module 104 to subscribe to a metadata feed (e.g., a feed of newly generated and/or updated metadata) from the data-management system.

In some examples, receiving module 104 may receive metadata from a data-management system as part of discovering and/or monitoring the information-asset sources, the information assets, and/or the information-asset metadata that are managed by the data-management system. In one example, receiving module 104 may identify one or more data-management systems (e.g., data-management systems 128) that manage an entity's information assets and then query each data-management system for information about the information-asset sources, the information assets, and/or the information-asset metadata that are managed by the data-management system. In some examples, the application programming interface may enable receiving module 104 to request metadata of a particular information asset using an identifier of the information asset (such as, e.g., a fingerprint or hash). In at least one example, receiving module 104 may ensure that the metadata that it receives and that is and will be stored in a global metadata repository is complete and up to date by periodically querying the data-management systems.

In addition to receiving metadata from data-management systems, receiving module 104 may gather metadata of information assets by directly scanning the sources of the information assets. In one example, receiving module 104 may scan an information-asset source to identify the information assets stored therein. In some examples, receiving module 104 may periodically scan some or all of the information-asset sources within an entity's environment to ensure that each information asset of an entity is represented in a global metadata repository and/or to ensure that the metadata stored in the global metadata repository is complete and up to date.

In one example, receiving module 104 may identify and gather metadata of the information assets that are stored in a particular information-asset source without scanning the information-asset source by requesting, from a backup system that generated a backup of the information-asset source, an inventory of each information asset that is contained in a backup of the information-asset source (e.g., the most recent backup of the information-asset source). In at least one example, the backup system may generate the inventory from a backup catalog maintained by the backup system. In some examples, the backup catalog of the backup system may also include information-asset metadata, which may be included in the inventory provided to receiving module 104. In some examples, receiving module 104 may detect changes to the information assets stored in the information-asset source (e.g., new information assets, updates, and deletes) by requesting, from the backup system, an inventory of each information asset that has been created, updated, or deleted between the latest backups of the information-asset source. In at least one example, the backup system may generate the inventory by examining the most recent incremental backup of the information-asset source or by comparing the last two full backups of the information-asset source.

In some situations, several data-management systems may be capable of generating the same metadata of an information asset. For at least this reason, receiving module 104 may coordinate the data-management systems so that (1) only one of the data-management systems generate the metadata and attempts to store the metadata in a global metadata repository and (2) the other data-management systems access the metadata from the global metadata repository. In some examples, receiving module 104 may also coordinate data-management systems so that at least one of the data-management systems gathers metadata for each information asset and/or from each information-asset source within an entity's environment without any duplication of effort.

At step 304, one or more of the systems described herein may receive a second instance of metadata of the information asset from a second data-management system that manages the information assets of the entity in a second domain that is separate and distinct from the first domain. For example, receiving module 104 may, as part of server 206 in FIG. 2, receive metadata 214 of information asset 140(2) from data-management system 202(N) that manages information assets stored to information-asset source 210. Step 304 is similar to step 302, therefore, the discussion of step 302 may also apply to step 304.

At step 306, one or more of the systems described herein may store the first and second instances of metadata in a global metadata repository that is separate and distinct from the first and second data-management systems such that the first and second instances of metadata are associated with the information asset. For example, storing module 106 may, as part of server 206 in FIG. 2, store metadata 212 and 214 to global metadata repository 120 such that metadata 212 and 214 are associated with information asset 140 (e.g., as illustrated in FIGS. 5-7).

As used herein, the term "global metadata repository" generally refers to any single logical repository of information-asset metadata that is separate and distinct from at least two data-management systems that contribute and/or access the information-asset metadata stored in the global metadata repository. In some examples, the term "global metadata repository" may refer to a centralized or single-instance database. In other examples, the term "global metadata repository" may refer to a database that is physically distributed. For example, a global metadata repository may be deployed using a backing database (such as, e.g., CASSANDRA) that has multiple nodes and that can replicate metadata within and across datacenters. A global metadata repository may be considered separate and distinct from two data-management systems if neither of the two data-management systems are necessary for the global metadata repository to function. Additionally or alternatively, a global metadata repository may be considered separate and distinct from two data-management systems if failure of either of the two data-management systems does not cause failure of the global metadata repository.

Storing module 106 may store metadata in a global metadata repository in a variety of ways. In one example, storing module 106 may store metadata of an information asset in a global metadata repository by writing the metadata to the global metadata repository and by associating the metadata with a representation of the information asset. Using FIGS. 4 and 5 as an example, storing module 106 may write metadata 212, 402, 404 (e.g., metadata of information asset 140(1) received from data-management system 202(1) as part of step 302) and metadata 214, 406, 408 (e.g., metadata of information asset 140(2) received from data-management system 202(N) as part of step 304) in global metadata repository 120 and may associate metadata 212, 214, 402, 404, 406, and 408 with a single representation of information asset 140 (in this example, information asset 500).

In some situations, the systems described herein may receive metadata of two instances of the same information asset. For example, receiving module 104 may receive metadata 212, 402, 404 of information asset 140(1) (e.g., a first instance of information asset 140) and metadata 214, 406, 408 of information asset 140(2) (e.g., a second instance of information asset 140). In this situation, storing module 106 may store the metadata of both instances of the information asset in a global metadata repository by writing the metadata of both instances of the information asset in the global metadata repository and by associating the metadata of both instances of the information asset with a single representation of the information asset (e.g., as described above in connection with FIGS. 4 and 5).

Additionally or alternatively, storing module 106 may store the metadata of both instances of the information asset in a global metadata repository by (1) writing the metadata of both instances of the information asset in the global metadata repository, (2) associating the metadata of the first instance of the information asset with a single representation of the first instance of the information asset stored in the global metadata repository, (3) associating the metadata of the second instance of the information asset with a single representation of the second instance of the information asset stored in the global metadata repository, and (4) associating the representations of the first and second instances of the information asset. Using FIGS. 4 and 6 as an example, storing module 106 may (1) write metadata 212, 402, 404 and metadata 214, 406, 408 to global metadata repository 120, (2) associate metadata 212, 402, and 404 with a single representation of information asset 140(1) (in this example, information asset 602), (3) associate metadata 214, 406, and 408 with a single representation of information asset 140(2) (in this example, information asset 604), and (4) associate the representations of information asset 140(1) and 140(2) with a global representation of information asset 140 (in this example, information asset 600).

In some examples, storing module 106 may identify the information asset to which to associate an instance of metadata using an identifier (e.g., a fingerprint or hash) that was generated by a data-management system and received with the metadata. Additionally or alternatively, storing module 106 may identify the information asset to which to associate an instance of metadata by generating an identifier (e.g., a fingerprint or hash) and using the generated identifier to identify the information asset. In some examples, a data-management system or storing module 106 may generate an identifier based on the non-metadata contents of the information asset and/or the metadata associated with the information asset. In at least one example, storing module 106 may determine that two information assets are instances of the same information asset in order to associate the two information assets and/or to associate their metadata. In at least one example, storing module 106 may determine that two information assets are instances of the same information asset based on how similar the metadata of one instance of the information asset is to that of the other instance.

Storing module 106 may store metadata of information assets to a global metadata repository using any suitable storage schema that provides a normalized, unified, and consistent view of an information asset's metadata aggregated from two or more disparate data-management systems, that enables metadata to be associated with information assets, and/or that maintains the relationships between multiple instances of a single information asset. In some examples, storing module 106 may use a normalized schema to store metadata in a global metadata repository. As used herein, the term "normalized schema" generally refers to any database schema that provides a unified and consistent view of an information asset's metadata and/or any database schema that avoids redundancies and inconsistencies in stored metadata.

Additionally or alternatively, storing module 106 may use an extensible schema to store metadata. In one example, storing module 106 may use an extensible schema that includes, for each information asset stored in a global metadata repository, a core set of metadata (e.g., a set of metadata that is common to all information assets stored in the global metadata repository) and/or one or more sets of specialized metadata (e.g., one or more sets of metadata that are specialized for a particular kind of information asset or domain). Using FIGS. 4 and 7 as an example, storing module 106 may store metadata 212, 404, and 214 to global metadata repository 120 as part of a set of core metadata 702 that is associated with information asset 700 (e.g., a representation of information asset 140) and may store metadata 402, 406, and 408 to global metadata repository 120 as part of a set of specialized metadata 704 that is also associated with information asset 700.

In at least one example, by using an extensible schema to store metadata, storing module 106 may enable a data-management system to augment the metadata of an information asset represented in a global metadata repository with any attributes that it deems valuable. In some examples, two or more data-management systems may be integrated by configuring the data-management systems to share their metadata via a core or specialized set of metadata stored in a global metadata repository. In at least one example, a data-management system may share metadata with an entity by storing its metadata to a global metadata repository through which the entity may consume the metadata.

At step 308, one or more of the systems described herein may provide access to the first and second instances of metadata stored in the global metadata repository to the first data-management system, the second data-management system, and/or the entity. For example, providing module 108 may, as part of server 206 in FIG. 2, provide access to metadata 212 and 214 stored in global metadata repository 120 to data-management systems 202(1)-(N), electronic-discovery system 203, and/or an owner of information asset 140.

Providing module 108 may provide access to metadata stored in a global metadata repository in any suitable manner. In one example, providing module 108 may provide access to the metadata stored in a global metadata repository to data-management systems via an application programming interface that provides query and search capabilities. In some examples, providing module 108 may enable a data-management system to access metadata associated with a particular information asset of interest. In at least one example, providing module 108 may enable a data-management system to identify (e.g., using a fingerprint or hash) an information asset for which metadata is requested.

Additionally or alternatively, providing module 108 may enable a data-management system to search for information assets with a particular set of attributes (e.g., a particular file size, location, classification, and/or owner). In at least one example, providing module 108 may enable a data-management system to search for additional instances of a particular information asset.

In some examples, by enabling data-management systems to query and search the metadata stored in a global metadata repository, providing module 108 may enable data-management systems to efficiently discover what information assets exist in information-asset sources without scanning the information-asset sources, which may reduce load on the information-asset sources and/or significantly reduce the time taken by data-management systems to discover information assets. For at least this reason, data-management systems that use a global metadata repository as a source of metadata may scan an information-asset source to discover what information assets exist in the information-asset source only after querying the global metadata repository and determining that this information is not contained in the global metadata repository.

In some examples, by enabling data-management systems to query and search the metadata stored in a global metadata repository, providing module 108 may enable disparate data-management systems to share enriched or calculated metadata. For example, providing module 108 may enable an electronic discovery system or a backup system to determine whether an information asset has been classified as sensitive by a data-loss-prevention system.

In some examples, by enabling data-management systems to query and search the metadata stored in a global metadata repository, providing module 108 may reduce or eliminate duplication of effort amongst the data-management systems by enabling data-management systems that are capable of generating the same metadata (e.g., a classification) to generate the metadata only once for each information asset. For at least this reason, data-management systems that use a global metadata repository as a source of metadata may generate metadata of an information asset only after querying the global metadata repository and determining that the metadata of the information asset is not stored in the global metadata repository.

In some examples, providing module 108 may provide metadata stored in a global metadata repository to an entity by providing an analysis or summary of the metadata stored in the global metadata repository to the entity. In one example, providing module 108 may provide, via a graphical user interface, an analysis of an entity's information assets to the entity that describes all or a portion of the entity's information assets, the locations of the information assets, how the information assets are being used, the value of the information assets, and/or any other metadata-based information about the entity's information assets.

In some examples, providing module 108 may provide, via a graphical user interface, a search tool to the entity that enables the entity to search for information assets based on the metadata stored in a global metadata repository. In one example, such a search tool may enable the entity to search for information assets with particular attributes (e.g., a particular file size, classification, or owner) and/or additional instances of a particular information asset.

In some examples, providing module 108 may enable a data-management system to subscribe to event notifications that are triggered by providing module 108 when an event of interest occurs to the metadata stored in a global metadata repository. For example, providing module 108 may enable a data-management system to subscribe to an event notification that is triggered when the metadata of a particular information asset is updated by another data-management system. In another example, providing module 108 may enable a data-management system to subscribe to an event notification that is triggered when metadata indicating a new instance of a particular information asset is stored to the global metadata repository. In at least one example, providing module 108 may enable a data-management system to subscribe to an event notification that is triggered when an attribute of an information asset is set to a particular value. For example, providing module 108 may enable a data-management system to subscribe to an event notification that is triggered when an information asset is classified as sensitive. Upon completion of step 308, exemplary method 300 in FIG. 3 may terminate.

Figure 8:
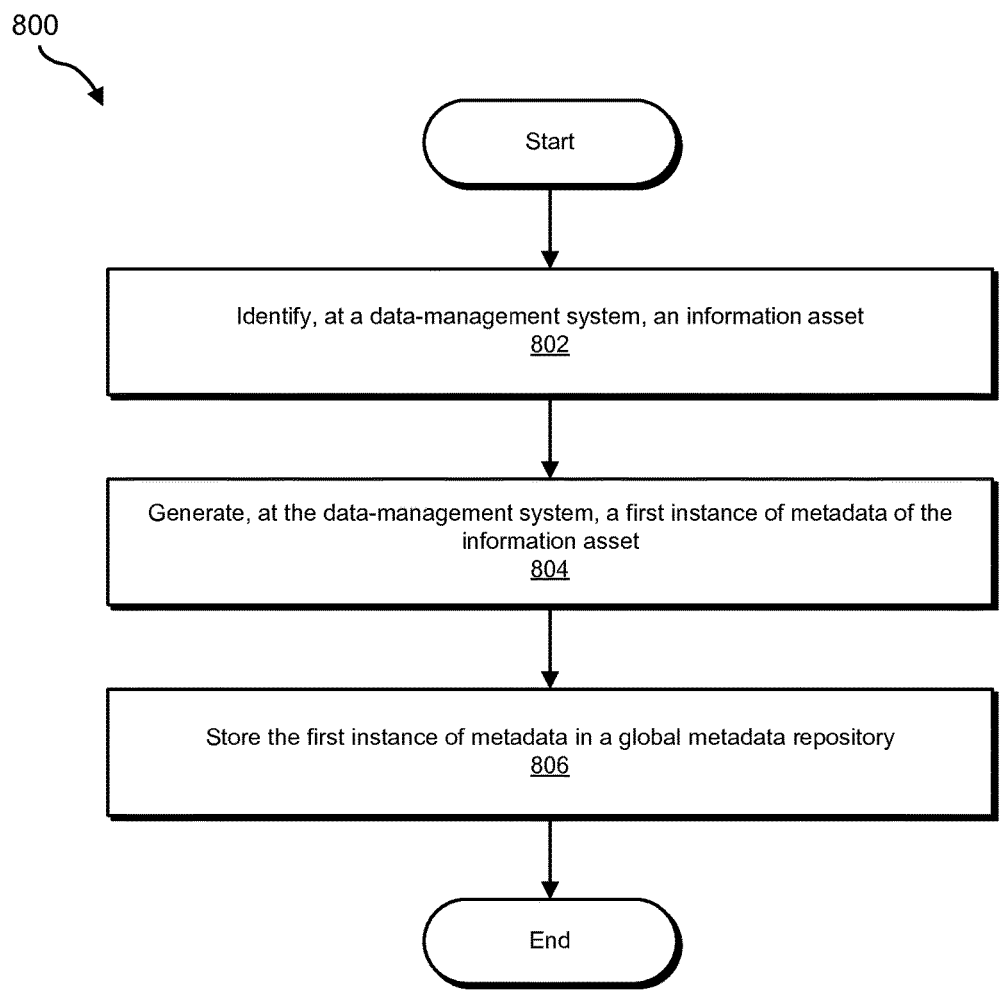
FIG. 8 is a flow diagram of an exemplary method for utilizing information-asset metadata aggregated from multiple disparate data-management systems.

As indicated above, the systems and methods described herein may enable disparate data-management systems to use a global metadata repository to store and access information-asset metadata. FIG. 8 is a flow diagram of an exemplary computer-implemented method 800 for storing information-asset metadata to a global metadata repository. The steps shown in FIG. 8 may be performed by any suitable computer-executable code and/or computing system. In some embodiments, the steps shown in FIG. 8 may be performed by one or more of the components of system 100 in FIG. 1, system 200 in FIG. 2, computing system 1410 in FIG. 14, and/or portions of exemplary network architecture 1500 in FIG. 15.

As illustrated in FIG. 8, at step 802, one or more of the systems described herein may identify, at a data-management system, an information asset. For example, identifying module 110 may, as part of data-management system 202(1) in FIG. 2, identify information asset 140(1).

The systems described herein may perform step 802 in any suitable manner. In general, identifying module 110 may identify an information asset while performing normal data-management operations of a data-management system. For example, identifying module 110 may, as part of a backup system, identify a file while backing up files. In another example, identifying module 110 may, as part of an email-archiving system, identify an email while archiving emails. In another example, identifying module 110 may, as part of a data-loss-prevention system, identify an information asset while scanning information assets for sensitive information.

In some examples, identifying module 110 may identify an information asset while scanning the information-asset source on which the information asset is stored. In at least one example, identifying module 110 may identify an information asset by querying a global metadata repository for information assets stored to a specified information-asset source. Additionally or alternatively, identifying module 110 may identify an information asset by receiving a notification from an information-asset source that indicates that the information asset has been modified (e.g., created, updated, or deleted).

In at least one example, identifying module 110 may identify an information asset by receiving, from a system that manages a global metadata repository, a request for metadata of the information asset. For example, identifying module 110 may, as part of data-management system 202(1) in FIG. 2, identify an information asset by receiving, from receiving module 104 on server 206, a request for metadata of the information asset.

At step 804, one or more of the systems described herein may generate, at the data-management system, a first instance of metadata of the information asset. For example, generating module 112 may, as part of data-management system 202(1) in FIG. 2, generate metadata 212 of information asset 140(1).

The systems described herein may perform step 804 in any suitable manner. In general, generating module 112 may, as part of a data-management system, generate metadata of an information asset while performing normal data-management operations of the data-management system. For example, generating module 112 may, as part of a backup system, generate metadata of a file that indicates that the file is contained in a backup created by the backup system. In another example, generating module 112 may, as part of an email-archiving system, generate metadata of an email that indicates that all or a portion of the email has been archived to an archival storage system. In another example, generating module 112 may, as part of a data-loss-prevention system, generate a classification of an information asset that indicates that the information asset contains sensitive information.

In some examples, generating module 112 may generate metadata of an information asset by discovering the information asset or an attribute of the information asset. For example, generating module 112 may generate metadata of a file by discovering the size of the file or the location of the file. In at least one example, generating module 112 may discover metadata of an information asset without examining the content of the information asset. For example, generating module 112 may discover a name, a size, or a data type of a text document without examining the words contained in the text document.

Additionally or alternatively, generating module 112 may generate metadata of an information asset by creating an attribute of the information asset. For example, generating module 112 may generate metadata of an information asset by classifying the information asset. In some examples, generating module 112 may generate metadata of an information asset by creating an association between the information asset and another information asset. For example, generating module 112 may generate metadata of an information asset by creating an association between an information asset and a container of the information asset (e.g., a backup). In some examples, generating module 112 may generate metadata of an information asset by updating metadata of the information asset in response to changes to the information asset (e.g., modification and/or deletions).

In some examples, generating module 112 may not generate metadata of an information asset if the metadata is already accessible via a global metadata repository. In one example, generating module 112 may determine whether metadata is or is not already accessible via a global metadata repository by querying the global metadata repository. In some examples, generating module 112 may determine that metadata is already accessible via a global metadata repository by receiving a notification from the global metadata repository that indicates that another data-management system has been tasked with generating the metadata.

At step 806, one or more of the systems described herein may store the first instance of metadata in a global metadata repository. For example, storing module 106 may, as part of data-management system 202(1) in FIG. 2, store metadata 212 in global metadata repository 120.

The systems described herein may perform step 806 in any suitable manner. For example, storing module 106 may, as part of a data-management system, transmit metadata to a system that manages a global metadata repository to be stored to the global metadata repository. In some examples, storing module 106 may transmit the metadata to the system that manages the global metadata repository via an application programming interface of the global metadata repository that enables data-management systems to store information-asset metadata to the global metadata repository. In some examples, storing module 106 may transmit metadata to the system that manages the global metadata repository in response to a request from the system. In some examples, storing module 106 may transmit metadata to the system that manages the global metadata repository in response to a request from the system to push metadata to the system whenever it is created or updated. In at least one example, storing module 106 may, as part of a data-management system, provide an application programming interface that enables the system that manages the global metadata repository to pull information-asset metadata from the data-management system. Upon completion of step 806, exemplary method 800 in FIG. 8 may terminate.

In some examples, a data-management system may use a centralized global metadata repository as both a repository and a source of its own metadata. Additionally or alternatively, a data-management system may use a global metadata repository as a source of metadata that has been generated by other data-management systems. In at least one example, a data-management system may use metadata that has been generated by other data-management systems and that can be access via the centralized global metadata repository to perform some or all of its data-management operations. For example, a data-management system may use metadata that has been generated by other data-management systems to discover what information assets exist in an information-asset source without scanning the information-asset source. In another example, a backup system may use classification metadata (e.g., metadata that indicates that an information asset is sensitive) that has been generated by a data-loss-prevention system to identify and backup sensitive information assets. In another example, an electronic discovery system may use ownership metadata that has been generated by a system to identify a set of information assets belonging to a particular custodian of interest.

Figure 9:
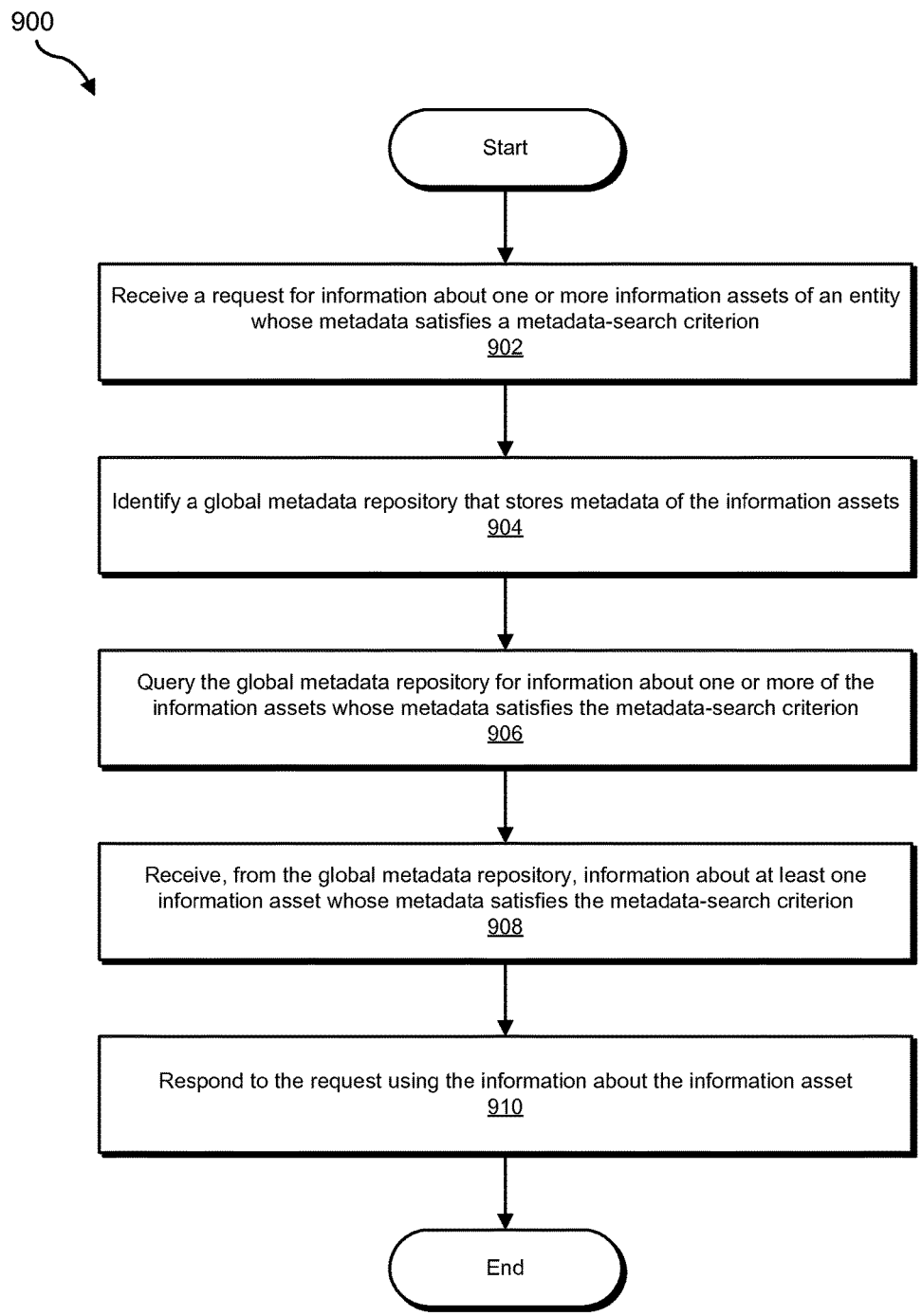
FIG. 9 is a flow diagram of an exemplary method for utilizing information-asset metadata aggregated from multiple disparate data-management systems.

FIG. 9 is a flow diagram of an exemplary computer-implemented method 900 for utilizing the information-asset metadata stored in a global metadata repository to enable an entity to search for, identify, collect, and/or review a particular subset of the entity's information assets. The steps shown in FIG. 9 may be performed by any suitable computer-executable code and/or computing system. In some embodiments, the steps shown in FIG. 9 may be performed by one or more of the components of system 100 in FIG. 1, system 200 in FIG. 2, computing system 1410 in FIG. 14, and/or portions of exemplary network architecture 1500 in FIG. 15.

As illustrated in FIG. 9, at step 902, one or more of the systems described herein may receive a request for information about one or more information assets of an entity whose metadata satisfies a metadata-search criterion. For example, request-receiving module 103 may, as part of electronic-discovery system 203 in FIG. 2, receive a request for information about one or more information assets stored in information-asset sources 208 and 210 whose metadata satisfies metadata-search criteria 1100 in FIG. 11.

Request-receiving module 103 may receive requests for information about an entity's information assets in a variety of contexts. In one example, request-receiving module 103 may receive requests for information about an entity's information assets as part of any data-management system that enables users to use metadata-based search criterion to search for, identify, collect, and/or review a particular subset of the entity's information assets. For example, request-receiving module 103 may receive requests for information about an entity's information assets as part of an electronic-discovery system 203 that enables a user (e.g., a member of an electronic-discovery support team) to use metadata-based search criterion to perform electronic-discovery operations (such as, e.g., early case assessment).

Request-receiving module 103 may receive requests for information about information assets whose metadata satisfies various metadata-search criteria. As used herein, the term "metadata-search criterion" generally refers to any search criterion that is based on information-asset metadata and that defines and/or may be used to identify a particular subset of an entity's information assets. In the context of electronic discovery, a set of metadata-search criterion may represent collection criteria used to perform early case assessment. For example, a set of metadata-search criterion may refer to collection criteria that have been defined by an attorney or a paralegal and that may be used by an electronic-discovery support team to perform electronic discovery.

FIGS. 11-13 illustrate several exemplary sets of metadata-search criterion. As shown in FIG. 11, exemplary metadata-search criteria 1100 may define a set of information assets that are owned by either User1 or User2 and that were created, modified, or accessed between 01/01/14 and 03/01/14. As shown in FIG. 12, exemplary metadata-search criteria 1200 may define a set of information assets that have been assigned the tag "ProjectX" and that were created, modified, or accessed between 02/01/14 and 03/31/14. As shown in FIG. 13, exemplary metadata-search criteria 1300 may define a set of information assets that are owned by User1 and that have been assigned the classification "Business."

Request-receiving module 103 may receive requests for various kinds of information about an entity's information assets. In one example, request-receiving module 103 may receive requests for an inventory of the information assets whose metadata satisfies a metadata-search criterion. In some examples, request-receiving module 103 may also receive requests for metadata associated with each information asset whose metadata satisfies a metadata-search criterion. In at least one example, request-receiving module 103 may receive a request for a copy of each information asset whose metadata satisfies a metadata-search criterion.

In some examples, request-receiving module 103 may receive a request for information about information assets whose metadata currently satisfies a metadata-search criterion. Additionally or alternatively, request-receiving module 103 may receive a request to be notified when the metadata of any information asset subsequently satisfies a metadata-search criterion. For example, request-receiving module 103 may receive a request to be notified when any of an entity's information assets subsequently are assigned a particular classification (e.g., sensitive).

At step 904, one or more of the systems described herein may identify a global metadata repository that stores metadata of the information assets. For example, repository-identifying module 105 may, as part of electronic-discovery system 203 in FIG. 2, identify global metadata repository 120 that stores metadata of the information assets stored in information-asset sources 208 and 210. Repository-identifying module 105 may identify a global metadata repository 120 in any suitable manner. For example, repository-identifying module 105 may identify a global metadata repository by reading a configuration file that identifies the global metadata repository.

Figure 10:
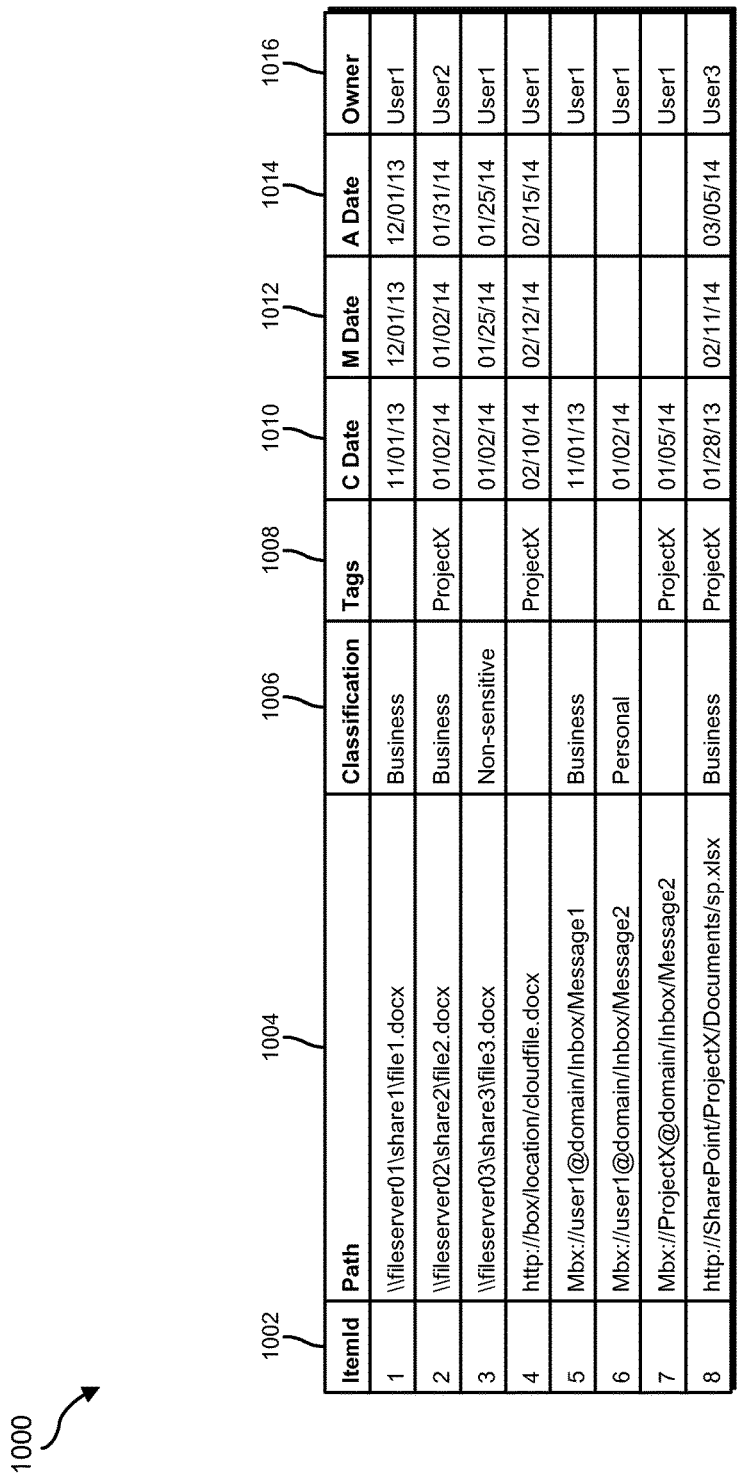
FIG. 10 is a block diagram of exemplary information-asset metadata.

An exemplary metadata table 1000 is shown in FIG. 10 that illustrates the metadata that may be stored in an exemplary global metadata repository. As illustrated in this figure, column 1002 within metadata table 1000 may represent a list of identifiers of the information assets represented in the global metadata repository. Column 1004 within metadata table 1000 may represent source paths of the information assets. Column 1006 within metadata table 1000 may represent classifications associated with the information assets. Column 1008 within metadata table 1000 may represent tags associated with the information assets represented in the global metadata repository. Column 1010 within metadata table 1000 may represent the dates that the information assets were created. Column 1012 within metadata table 1000 may represent the dates that the information assets were last modified. Column 1014 within metadata table 1000 may represent the dates that the information assets were last accessed. Column 1016 within metadata table 1000 may represent owners of the information assets.

In some examples, the metadata illustrated in metadata table 1000 may have been contributed by multiple disparate data-management systems. For example, the classifications in column 1006 may have been generated and contributed by a data-loss-prevention system, the tags in column 1008 may have been generated and contributed by a collaboration system, the dates in columns 1010-1014 may have been generated and contributed by various storage systems, and the ownership metadata in column 1016 may have been generated and contributed by an unstructured-data-governance system (such as, e.g., SYMANTEC's DATA INSIGHT) that determined the owner of each information asset by tracking usage patterns (e.g., usage patterns that indicate who accessed, updated, and/or shared each information asset the most).

In some examples, by using a global metadata repository that already contains metadata of all or a portion of an entity's information assets, a data-management system may identify, collect, and/or review a particular subset of the entity's information assets without needing to scan the sources of the entity's information assets and/or without needing to independently generate some or all of the metadata required to identify the subset of the entity's information assets.

At step 906, one or more of the systems described herein may query the global metadata repository for information about one or more of the information assets whose metadata satisfies the metadata-search criterion. For example, querying module 107 may, as part of electronic-discovery system 203 in FIG. 2, query global metadata repository 120 for information about one or more of the information assets stored in information-asset sources 208 and 210 whose metadata satisfies metadata-search criterion 1100 in FIG. 11.

Querying module 108 may query a global metadata repository in a variety of ways. In general, querying module 107 may query a global metadata repository for whatever information is necessary to respond to the request received as part of step 902. For example, if the request was for an inventory of information assets, querying module 107 may query the global metadata repository for a list of the information assets represented within the global metadata repository whose associated metadata matches the metadata-search criterion. Additionally or alternatively, if the request was for metadata, querying module 107 may query the global metadata repository for metadata of the information assets represented within the global metadata repository whose associated metadata matches the metadata-search criterion. In at least one example, if the request was for copies of information assets, request-receiving module 103 may query the global metadata repository for copies of the information assets represented within the global metadata repository whose associated metadata matches the metadata-search criterion. In at least one example, the global metadata repository may be configured to retrieve, on behalf of data-management systems, information assets from the information-asset sources on which the information assets are stored.

In some examples, querying module 107 may query a global metadata repository by transmitting the metadata-search criterion received as part of step 902 to the global metadata repository via an exposed application programming interface of the global metadata repository. In some examples, querying module 107 may convert the metadata-search criterion received as part of step 902 in to a suitable format recognized by the global metadata repository.

In at least one example, querying module 107 may register, with a global metadata repository, to receive a notification whenever the metadata of any of the information assets stored within the global metadata repository subsequently satisfies the metadata-search criterion as a result of being updated by another data-management system that contributes metadata to the global metadata repository. In at least one example, querying module 107 may register, with the global metadata repository, to receive notifications by registering an endpoint Uniform Resource Identifier (URI) with the global metadata repository to which the global metadata repository may push the notifications (e.g., notifications that identify and/or that contain copies of the information assets whose metadata subsequently satisfies the metadata-search criterion).

At step 908, one or more of the systems described herein may receive, from the global metadata repository, information about at least one information asset whose metadata satisfies the metadata-search criterion. For example, information-receiving module 109 may, as part of electronic-discovery system 203 in FIG. 2, receive, from the global metadata repository, dataset 1102 in FIG. 11 that includes information about information assets whose metadata satisfies search criteria 1100 in FIG. 11.

Using FIGS. 10 and 11 as an example, in response to querying a global metadata repository containing the metadata illustrated in metadata table 1000 in FIG. 10 for information about one or more information assets whose metadata satisfies metadata-search criteria 1100, information-receiving module 109 may receive, from the global metadata repository, dataset 1102 that includes information about the five information assets within the global metadata repository whose metadata satisfies metadata-search criteria 1100.

Using FIGS. 10 and 12 as another example, in response to querying a global metadata repository containing the metadata illustrated in metadata table 1000 in FIG. 10 for information about one or more information assets whose metadata satisfies metadata-search criteria 1200, information-receiving module 109 may receive, from the global metadata repository, dataset 1202 that includes information about the two information assets within the global metadata repository whose metadata satisfies metadata-search criteria 1200.

Using FIGS. 10 and 13 as another example, in response to querying a global metadata repository containing the metadata illustrated in metadata table 1000 in FIG. 10 for information about one or more information assets whose metadata satisfies metadata-search criteria 1300, information-receiving module 109 may receive, from the global metadata repository, dataset 1302 that includes information about the two information assets within the global metadata repository whose metadata satisfies metadata-search criteria 1300.

At step 910, one or more of the systems described herein may respond to the request using the information about the information asset. For example, responding module 111 may, as part of electronic-discovery system 203 in FIG. 2, respond to the request for information about one or more information assets stored in information-asset sources 208 and 210 whose metadata satisfies search criteria 1100 in FIG. 11 using result set 1102.

Responding module 111 may respond to requests in a variety of ways. In one example, responding module 111 may respond to the requests received as part of step 902 by simply relaying the information received from the global metadata repository as part of step 908. Using FIGS. 11-13 as examples, responding module 111 may respond to the requests received as part of step 902 for information about information assets whose metadata satisfies metadata-search criteria 1100, 1200, and 1300 with datasets 1102, 1202, and 1302, respectively.

In at least one example, if the request received as part of step 902 requested copies of the information assets whose metadata satisfies the metadata-search criterion, responding module 111 may respond to the request by (1) using location metadata received from the global metadata repository as part of step 908 to retrieve the information asset from the information-asset source to which the information asset is stored and (2) responding to the request with the information asset. Alternatively, if the copies of the information assets whose metadata satisfies the metadata-search criterion were received as part of step 908, responding module 111 may respond to the request with the copies received from the global metadata repository. Upon completion of step 910, exemplary method 900 in FIG. 9 may terminate.

As explained above, by aggregating information-asset metadata of an entity's information assets from multiple disparate data-management systems into a single global metadata repository, the systems and methods described herein may provide a normalized, unified, and consistent view of the entity's information assets to one or more data-management systems (such as, e.g., an electronic-discovery system). In one example, the systems and methods described herein may aggregate information-asset metadata into a single global metadata repository by enabling disparate data-management systems to contribute their knowledge about the information assets to the global metadata repository.

Moreover, by creating the global metadata repository, the systems and methods described herein may enable data-management systems to gain, from a single source, a complete understanding of the organization's information assets and how the information assets are and should be managed. Furthermore, by enabling disparate data-management systems to access and enrich a global metadata repository, the systems and methods described herein may enable data-management systems to efficiently share metadata such that (1) at least one data-management system may be able to discover an entity's information assets that exist across multiple sources without scanning the sources themselves, (2) valuable knowledge about information assets may be shared amongst several data-management systems (e.g., knowledge indicating that an asset is sensitive or valuable), and (3) duplications of effort may be reduced or eliminated. For example, by using a global metadata repository that already contains metadata of all or a portion of an entity's information assets, a data-management system may identify, collect, and/or review a particular subset of the entity's information assets without needing to scan the sources of the entity's information assets and/or without needing to independently generate some or all of the metadata required to identify the subset of the entity's information assets.

Figure 14:
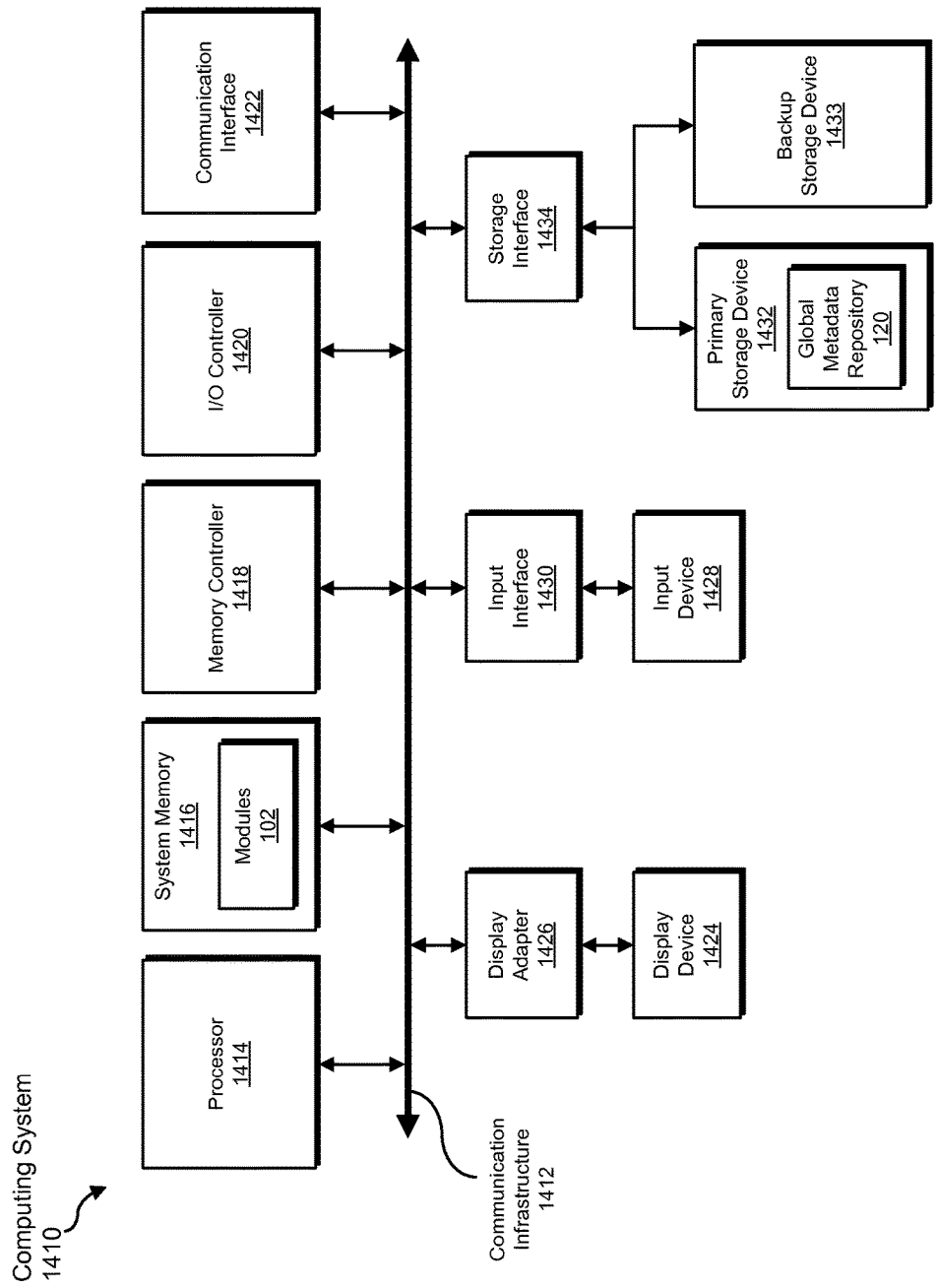
FIG. 14 is a block diagram of an exemplary computing system capable of implementing one or more of the embodiments described and/or illustrated herein.

FIG. 14 is a block diagram of an exemplary computing system 1410 capable of implementing one or more of the embodiments described and/or illustrated herein. For example, all or a portion of computing system 1410 may perform and/or be a means for performing, either alone or in combination with other elements, one or more of the steps described herein (such as one or more of the steps illustrated in FIG. 3). All or a portion of computing system 1410 may also perform and/or be a means for performing any other steps, methods, or processes described and/or illustrated herein.

Computing system 1410 broadly represents any single or multi-processor computing device or system capable of executing computer-readable instructions. Examples of computing system 1410 include, without limitation, workstations, laptops, client-side terminals, servers, distributed computing systems, handheld devices, or any other computing system or device. In its most basic configuration, computing system 1410 may include at least one processor 1414 and a system memory 1416.

Processor 1414 generally represents any type or form of physical processing unit (e.g., a hardware-implemented central processing unit) capable of processing data or interpreting and executing instructions. In certain embodiments, processor 1414 may receive instructions from a software application or module. These instructions may cause processor 1414 to perform the functions of one or more of the exemplary embodiments described and/or illustrated herein.

System memory 1416 generally represents any type or form of volatile or non-volatile storage device or medium capable of storing data and/or other computer-readable instructions. Examples of system memory 1416 include, without limitation, Random Access Memory (RAM), Read Only Memory (ROM), flash memory, or any other suitable memory device. Although not required, in certain embodiments computing system 1410 may include both a volatile memory unit (such as, for example, system memory 1416) and a non-volatile storage device (such as, for example, primary storage device 1432, as described in detail below). In one example, one or more of modules 102 from FIG. 1 may be loaded into system memory 1416.

In certain embodiments, exemplary computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an Industry Standard Architecture (ISA), Peripheral Component Interconnect (PCI), PCI Express (PCIe), or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434.

Communication interface 1422 broadly represents any type or form of communication device or adapter capable of facilitating communication between exemplary computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1422 may also allow computing system 1410 to engage in distributed or remote computing. For example, communication interface 1422 may receive instructions from a remote device or send instructions to a remote device for execution.

As illustrated in FIG. 14, computing system 1410 may also include at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer, as known in the art) for display on display device 1424.

As illustrated in FIG. 14, exemplary computing system 1410 may also include at least one input device 1428 coupled to communication infrastructure 1412 via an input interface 1430. Input device 1428 generally represents any type or form of input device capable of providing input, either computer or human generated, to exemplary computing system 1410. Examples of input device 1428 include, without limitation, a keyboard, a pointing device, a speech recognition device, or any other input device.

As illustrated in FIG. 14, exemplary computing system 1410 may also include a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a solid state drive, a floppy disk drive, a magnetic tape drive, an optical disk drive, a flash drive, or the like. Storage interface 1434 generally represents any type or form of interface or device for transferring data between storage devices 1432 and 1433 and other components of computing system 1410. In one example, global metadata repository 120 from FIG. 1 may be stored in primary storage device 1432.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14. Computing system 1410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1410. All or a portion of the computer program stored on the computer-readable medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1410 may be configured as an Application Specific Integrated Circuit (ASIC) adapted to implement one or more of the exemplary embodiments disclosed herein.

Figure 15:
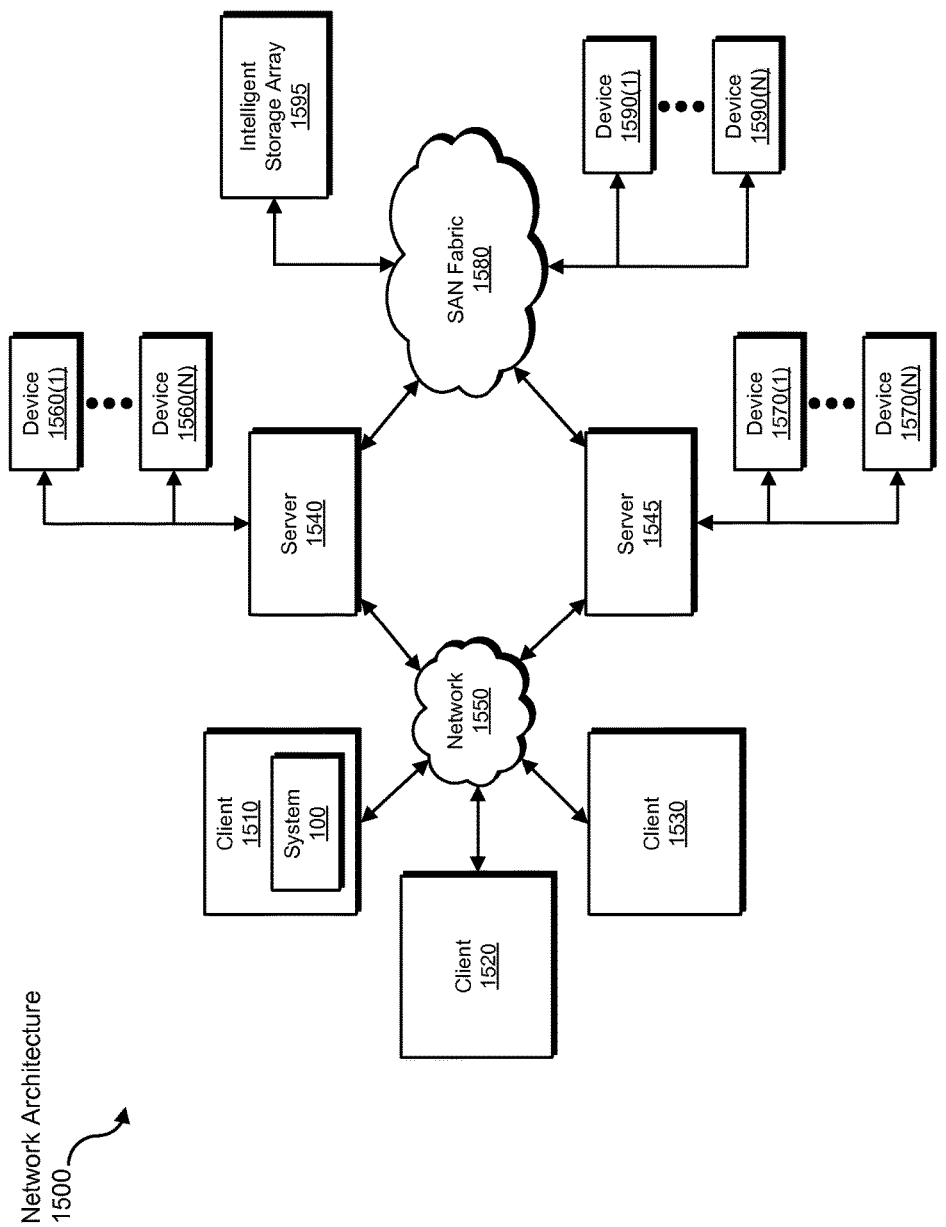
FIG. 15 is a block diagram of an exemplary computing network capable of implementing one or more of the embodiments described and/or illustrated herein.

FIG. 15 is a block diagram of an exemplary network architecture 1500 in which client systems 1510, 1520, and 1530 and servers 1540 and 1545 may be coupled to a network 1550. As detailed above, all or a portion of network architecture 1500 may perform and/or be a means for performing, either alone or in combination with other elements, one or more of the steps disclosed herein (such as one or more of the steps illustrated in FIG. 3). All or a portion of network architecture 1500 may also be used to perform and/or be a means for performing other steps and features set forth in the instant disclosure.

Client systems 1510, 1520, and 1530 generally represent any type or form of computing device or system, such as exemplary computing system 1410 in FIG. 14. Similarly, servers 1540 and 1545 generally represent computing devices or systems, such as application servers or database servers, configured to provide various database services and/or run certain software applications. Network 1550 generally represents any telecommunication or computer network including, for example, an intranet, a WAN, a LAN, a PAN, or the Internet. In one example, client systems 1510, 1520, and/or 1530 and/or servers 1540 and/or 1545 may include all or a portion of system 100 from FIG. 1.

As illustrated in FIG. 15, one or more storage devices 1560(1)-(N) may be directly attached to server 1540. Similarly, one or more storage devices 1570(1)-(N) may be directly attached to server 1545. Storage devices 1560(1)-(N) and storage devices 1570(1)-(N) generally represent any type or form of storage device or medium capable of storing data and/or other computer-readable instructions. In certain embodiments, storage devices 1560(1)-(N) and storage devices 1570(1)-(N) may represent Network-Attached Storage (NAS) devices configured to communicate with servers 1540 and 1545 using various protocols, such as Network File System (NFS), Server Message Block (SMB), or Common Internet File System (CIFS).

Servers 1540 and 1545 may also be connected to a Storage Area Network (SAN) fabric 1580. SAN fabric 1580 generally represents any type or form of computer network or architecture capable of facilitating communication between a plurality of storage devices. SAN fabric 1580 may facilitate communication between servers 1540 and 1545 and a plurality of storage devices 1590(1)-(N) and/or an intelligent storage array 1595. SAN fabric 1580 may also facilitate, via network 1550 and servers 1540 and 1545, communication between client systems 1510, 1520, and 1530 and storage devices 1590(1)-(N) and/or intelligent storage array 1595 in such a manner that devices 1590(1)-(N) and array 1595 appear as locally attached devices to client systems 1510, 1520, and 1530. As with storage devices 1560(1)-(N) and storage devices 1570(1)-(N), storage devices 1590(1)-(N) and intelligent storage array 1595 generally represent any type or form of storage device or medium capable of storing data and/or other computer-readable instructions.

In certain embodiments, and with reference to exemplary computing system 1410 of FIG. 14, a communication interface, such as communication interface 1422 in FIG. 14, may be used to provide connectivity between each client system 1510, 1520, and 1530 and network 1550. Client systems 1510, 1520, and 1530 may be able to access information on server 1540 or 1545 using, for example, a web browser or other client software. Such software may allow client systems 1510, 1520, and 1530 to access data hosted by server 1540, server 1545, storage devices 1560(1)-(N), storage devices 1570(1)-(N), storage devices 1590(1)-(N), or intelligent storage array 1595. Although FIG. 15 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1540, server 1545, storage devices 1560(1)-(N), storage devices 1570(1)-(N), storage devices 1590(1)-(N), intelligent storage array 1595, or any combination thereof. All or a portion of one or more of the exemplary embodiments disclosed herein may also be encoded as a computer program, stored in server 1540, run by server 1545, and distributed to client systems 1510, 1520, and 1530 over network 1550.

As detailed above, computing system 1410 and/or one or more components of network architecture 1500 may perform and/or be a means for performing, either alone or in combination with other elements, one or more steps of an exemplary method for utilizing information-asset metadata aggregated from multiple disparate data-management systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request for information about one or more information assets of an entity whose metadata satisfies a metadata-search criterion, transform the request into a query for a global metadata repository for information about one or more of the information assets whose metadata satisfies the metadata-search criterion, output a result of the transformation to the global metadata repository, use the result of the transformation to respond to the request, and store the result of the transformation to a storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing information-asset metadata aggregated from multiple disparate data-management systems, at least a portion of the method being performed by a first computing device comprising at least one processor, the method comprising:

receiving, by an electronic-discovery system executing on the first computing device, a request for information about one or more information assets of an entity whose metadata satisfies a metadata-search criterion, wherein:

the information assets of the entity are:

distributed across a plurality of information-asset sources of the entity; and managed by at least:

a first data-management system that:

executes on a second computing device;

generates, by scanning at least one of the plurality of information-asset sources, metadata for at least a first portion of the information assets; and transmits, via an application programming interface of a remote metadata repository executing on a third computing device, metadata for the first portion of the information assets to the third computing device for storage in the remote metadata repository; and a second data-management system that:

executes on a forth computing device;

generates, by scanning at least one of the plurality of information-asset sources, metadata for at least a second portion of the information assets; and transmits, via the application programming interface, the metadata for the second portion of the information assets to the third computing device for storage in the remote metadata repository;

the remote metadata repository stores the metadata for the first portion of the information assets and the metadata for the second portion of the information assets;

the first data-management system and the second data-management system are different types of data-management systems that manage the information assets of the entity in different fields of data management; and the first data-management system, the second data-management system, the electronic-discovery system, and the remote metadata repository are separate and distinct systems that are capable of independent operation;

querying, by the electronic-discovery system via the application programming interface, the remote metadata repository for information about one or more of the information assets whose metadata satisfies the metadata-search criterion;

receiving, by the electronic-discovery system via the application programming interface of the remote metadata repository, information about at least one information asset whose metadata satisfies the metadata-search criterion;

utilizing, at the electronic-discovery system, scanning efforts of the first data-management system or the second data-management system to discover the at least one information asset without scanning any of the plurality of information-asset sources by using the information, received from the remote metadata repository, about the information asset whose metadata satisfies the metadata-search criterion to discover the at least one information asset; and responding, by the electronic-discovery system, to the request using the information about the information asset.

2. The method of claim 1, wherein the first data-management system and the second data-management system generate different information-asset metadata.

3. The method of claim 1, wherein
the steps of receiving the request, identifying the remote metadata repository, querying the remote metadata repository, receiving the information, and responding to the request are performed by the electronic-discovery system as part of an early case assessment without scanning any of the plurality of information-asset sources.

4. The method of claim 1, wherein:
the metadata of the information assets stored in the remote metadata repository identifies at least one owner of each of the information assets;
at least one of the first data-management system and the second data-management system generated the metadata of the information assets stored in the remote metadata repository that identifies the owner of each of the information assets;
the metadata-search criterion comprises a criterion for identifying information assets of at least one specified owner.

5. The method of claim 1, wherein:
the metadata of the information assets stored in the remote metadata repository comprises at least one classification of at least one of the information assets;
at least one of the first data-management system and the second data-management system generated the classification of the at least one of the information assets;
the metadata-search criterion comprises a criterion for identifying information assets whose classification matches at least one specified classification.

6. The method of claim 1, wherein querying the remote metadata repository for information comprises registering, with the remote metadata repository, to receive a notification whenever the metadata of any of the information assets subsequently satisfies the metadata-search criterion as a result of being updated by at least one of the first data-management system and the second data-management system.

7. The method of claim 1, wherein:
the information asset is accessible via an information-asset source;
receiving the request for information about one or more information assets of the entity whose metadata satisfies the metadata-search criterion comprises receiving a request for one or more information assets of the entity whose metadata satisfies the metadata-search criterion;
responding to the request comprises:
using the information about the information asset to retrieve the information asset from the information-asset source;
responding to the request with the information asset.

8. The method of claim 1, wherein:
the information asset is accessible via an information-asset source;
receiving the request for information about one or more information assets of the entity whose metadata satisfies the metadata-search criterion comprises receiving a request for one or more information assets of the entity whose metadata satisfies the metadata-search criterion;
querying the remote metadata repository comprises requesting the information asset from the remote metadata repository;
receiving the information about the information asset comprises receiving, from the remote metadata repository, the information asset, the information asset having been retrieved from the information-asset source by the remote metadata repository;
responding to the request comprises responding to the request with the information asset.

9. The method of claim 1, wherein the plurality of information-asset sources comprise at least one of:
a file server;
a mail server;
a document server;
a collaboration system;
a social network;
a cloud-based storage system.

10. The method of claim 1, wherein the information asset comprises at least one of:
a file;
an email;
a document.

11. A system for utilizing information-asset metadata aggregated from multiple disparate data-management systems, the system comprising:
a request-receiving module, stored in memory, that receives, at an electronic-discovery system executing on a first computing device, a request for information about one or more information assets of an entity whose metadata satisfies a metadata-search criterion, wherein:
the information assets of the entity are:
distributed across a plurality of information-asset sources of the entity; and
managed by at least:
a first data-management system that:
executes on a second computing device;
generates, by scanning at least one of the plurality of information-asset sources, metadata for at least a first portion of the information assets; and transmits, via an application programming interface of a remote metadata repository executing on a third computing device, metadata for the first portion of the information assets to the third computing device for storage in the remote metadata repository; and a second data-management system that:
executes on a forth computing device;
generates, by scanning at least one of the plurality of information-asset sources, metadata for at least a second portion of the information assets; and
transmits, via the application programming interface, the metadata for the second portion of the information assets to the third computing device for storage in the remote metadata repository;

the remote metadata repository stores the metadata for the first portion of the information assets and the metadata for the second portion of the information assets;

the first data-management system and the second data-management system are different types of data-management systems that manage the information assets of the entity in different fields of data management; and the first data-management system, the second data-management system, the electronic-discovery system, and the remote metadata repository are separate and distinct systems that are capable of independent operation;

an identifying module, stored in memory, that identifies, at the electronic-discovery system, the remote metadata repository;

a querying module, stored in memory, that queries, at the electronic-discovery system via the application programming interface while refraining from scanning any of the plurality of information-asset sources, the remote metadata repository for information about one or more of the information assets whose metadata satisfies the metadata-search criterion;

an information-receiving module, stored in memory, that:
receives, at the electronic-discovery system via the application programming interface of the remote metadata repository while refraining from scanning any of the plurality of information-asset sources, information about at least one information asset whose metadata satisfies the metadata-search criterion; and
utilizes, at the electronic-discovery system, scanning efforts of the first data-management system or the second data-management system to discover the at least one information asset without scanning any of the plurality of information-asset sources by using the information, received from the remote metadata repository, about the information asset whose metadata satisfies the metadata-search criterion to discover the at least one information asset;

a responding module, stored in memory, that responds, at the electronic-discovery system while refraining from scanning any of the plurality of information-asset sources, to the request using the information about the information asset; and at least one processor that executes the request-receiving module, the identifying module, the querying module, the information-receiving module, and the responding module.

12. The system of claim 11, wherein the first data-management system and the second data-management system generate different information-asset metadata.

13. The system of claim 11, wherein
the request-receiving module, the identifying module, the querying module, the information-receiving module, and the responding module receive the request, identify the remote metadata repository, query the remote metadata repository, receive the information, and respond to the request as part of performing an early case assessment without scanning any of the plurality of information-asset sources.

14. The system of claim 11, wherein:
the metadata of the information assets stored in the remote metadata repository identifies at least one owner of each of the information assets;
at least one of the first data-management system and the second data-management system generated the metadata of the information assets stored in the remote metadata repository that identifies the owner of each of the information assets;
the metadata-search criterion comprises a criterion for identifying information assets of at least one specified owner.

15. The system of claim 11, wherein:
the metadata of the information assets stored in the remote metadata repository comprises at least one classification of at least one of the information assets;
at least one of the first data-management system and the second data-management system generated the classification of the at least one of the information assets;
the metadata-search criterion comprises a criterion for identifying information assets whose classification matches at least one specified classification.

16. The system of claim 11, wherein the querying module queries the remote metadata repository for information by registering, with the remote metadata repository, to receive a notification whenever the metadata of any of the information assets subsequently satisfies the metadata-search criterion as a result of being updated by at least one of the first data-management system and the second data-management system.

17. The system of claim 11, wherein:
the information asset is accessible via an information-asset source;
the request-receiving module receives the request for information about one or more information assets of the entity whose metadata satisfies the metadata-search criterion by receiving a request for one or more information assets of the entity whose metadata satisfies the metadata-search criterion;
the responding module responds to the request by:
using the information about the information asset to retrieve the information asset from the information-asset source;
responding to the request with the information asset.

18. The system of claim 11, wherein:
the information asset is accessible via an information-asset source;
the request-receiving module receives the request for information about one or more information assets of the entity whose metadata satisfies the metadata-search criterion by receiving a request for one or more information assets of the entity whose metadata satisfies the metadata-search criterion;

the querying module queries the remote metadata repository by requesting the information asset from the remote metadata repository;

the information-receiving module receives the information about the information asset by receiving, from the remote metadata repository, the information asset, the information asset having been retrieved from the information-asset source by the remote metadata repository;

the responding module responds to the request by responding to the request with the information asset.

19. The system of claim 11, wherein:

the plurality of information-asset sources comprise at least one of:
- a file server;
- a mail server;
- a document server;
- a collaboration system;
- a social network;
- a cloud-based storage system;

the information asset comprises at least one of:
- a file;
- an email;
- a document.

20. A non-transitory computer-readable medium comprising one or more computer-executable instructions that, when executed by at least one processor of a first computing device, cause the first computing device to:

receive, by an electronic-discovery system executing on the first computing device, a request for information about one or more information assets of an entity whose metadata satisfies a metadata-search criterion, wherein:

the information assets of the entity are:
distributed across a plurality of information-asset sources of the entity; and
managed by at least:
a first data-management system that:
executes on a second computing device;
generates, by scanning at least one of the plurality of information-asset sources, metadata for at least a first portion of the information assets; and
transmits, via an application programming interface of a remote metadata repository executing on a third computing device, metadata for the first portion of the information assets to the third computing device for storage in the remote metadata repository; and a second data-management system that:
executes on a forth computing device;
generates, by scanning at least one of the plurality of information-asset sources, metadata for at least a second portion of the information assets; and
transmits, via the application programming interface, the metadata for the second portion of the information assets to the third computing device for storage in the remote metadata repository;

the remote metadata repository stores the metadata for the first portion of the information assets and the metadata for the second portion of the information assets;

the first data-management system and the second data-management system are different types of data-management systems that manage the information assets of the entity in different fields of data management; and the first data-management system, the second data-management system, the electronic-discovery system, and the remote metadata repository are separate and distinct systems that are capable of independent operation;

query, by the electronic-discovery system via the application programming interface, the remote metadata repository for information about one or more of the information assets whose metadata satisfies the metadata-search criterion;

receive, by the electronic-discovery system via the application programming interface of the remote metadata repository, information about at least one information asset whose metadata satisfies the metadata-search criterion;

utilize, by the electronic-discovery system, scanning efforts of the first data-management system or the second data-management system to discover the at least one information asset without scanning any of the plurality of information-asset sources by using the information, received from the remote metadata repository, about the information asset whose metadata satisfies the metadata-search criterion to discover the at least one information asset; and respond, by the electronic-discovery system, to the request using the information about the information asset.

* * * * *